(12) United States Patent
Bauco et al.

(10) Patent No.: US 12,085,755 B2
(45) Date of Patent: Sep. 10, 2024

(54) LASER CLEAVING AND POLISHING OF DOPED OPTICAL FIBERS

(71) Applicant: CORNING RESEARCH & DEVELOPMENT CORPORATION, Corning, NY (US)

(72) Inventors: Anthony Sebastian Bauco, Horseheads, NY (US); Kevin Wallace Bennett, Hammondsport, NY (US); Eric Raymond Logan, Huntersville, NC (US)

(73) Assignee: Corning Research & Development Corporation, Corning, NY (US)

( * ) Notice: Subject to any disclaimer, the term of this patent is extended or adjusted under 35 U.S.C. 154(b) by 312 days.

(21) Appl. No.: 17/341,764

(22) Filed: Jun. 8, 2021

(65) Prior Publication Data
US 2021/0389524 A1 Dec. 16, 2021

Related U.S. Application Data

(60) Provisional application No. 63/117,813, filed on Nov. 24, 2020, provisional application No. 63/039,815, filed on Jun. 16, 2020.

(51) Int. Cl.
*G02B 6/25* (2006.01)
*B23K 26/38* (2014.01)
*G02B 6/38* (2006.01)

(52) U.S. Cl.
CPC ............... *G02B 6/25* (2013.01); *B23K 26/38* (2013.01); *G02B 6/381* (2013.01); *G02B 6/3833* (2013.01)

(58) Field of Classification Search
None
See application file for complete search history.

(56) References Cited

U.S. PATENT DOCUMENTS

| | | | |
|---|---|---|---|
| 5,318,613 | A | 6/1994 | Amos et al. |
| 5,862,280 | A | 1/1999 | Tanaka et al. |
| 6,877,910 | B2 | 4/2005 | Takahashi et al. |
| 6,883,976 | B2 | 4/2005 | Sato |
| 7,341,383 | B2 | 3/2008 | Droege et al. |

(Continued)

FOREIGN PATENT DOCUMENTS

| | | |
|---|---|---|
| EP | 0443112 A1 | 8/1991 |
| EP | 0574704 A2 | 12/1993 |

(Continued)

OTHER PUBLICATIONS

European Patent Application No. 21179141.3, Extended European Search Report dated Oct. 21, 2021; 9 pages; European Patent Office.

(Continued)

*Primary Examiner* — Chad H Smith

(57) ABSTRACT

The present disclosure relates to an optical fiber having a core and a cladding, where the cladding is doped with a dopant. The cladding has a dopant concentration gradient in the radial direction such that a concentration of the dopant changes with respect to radial distance from a core-cladding interface. Doping the cladding of the optical fiber enables ablation of the fiber surface with a line source to provide an ablated wedge or crack such that cleaving can be achieved by applying a stress force to the fiber after ablation or by applying a pull force during ablation.

26 Claims, 11 Drawing Sheets

(56) References Cited

U.S. PATENT DOCUMENTS

| | | | |
|---|---|---|---|
| 7,435,012 B1 | 10/2008 | Beldycki | |
| 7,483,611 B2 * | 1/2009 | Matthijsse | G02B 6/02 |
| | | | 359/341.1 |
| 7,876,495 B1 | 1/2011 | Minelly | |
| 8,488,932 B2 | 7/2013 | Bennett et al. | |
| 8,696,215 B1 | 4/2014 | Fewkes et al. | |
| 8,702,322 B1 | 4/2014 | Danley et al. | |
| 8,764,314 B2 | 7/2014 | Danley et al. | |
| 9,016,953 B2 | 4/2015 | Ott et al. | |
| 9,151,895 B2 | 10/2015 | Miller et al. | |
| 9,195,006 B1 | 11/2015 | Hoener et al. | |
| 9,568,686 B2 | 2/2017 | Fewkes et al. | |
| 9,791,637 B2 | 10/2017 | Danley et al. | |
| 9,791,657 B2 | 10/2017 | Chien et al. | |
| 9,829,633 B2 | 11/2017 | McDonald et al. | |
| 10,295,747 B2 | 5/2019 | Gregorski | |
| 10,451,814 B2 | 10/2019 | Baca et al. | |
| 2002/0186934 A1 | 12/2002 | Hug et al. | |
| 2004/0156608 A1 * | 8/2004 | Po | G02B 6/03611 |
| | | | 385/127 |
| 2005/0196104 A1 | 9/2005 | Liu | |
| 2011/0300367 A1 | 12/2011 | Chien | |
| 2012/0195557 A1 * | 8/2012 | Nishioka | G02B 6/382 |
| | | | 385/98 |
| 2013/0126493 A1 | 5/2013 | Bedell et al. | |
| 2013/0343709 A1 | 12/2013 | Danley et al. | |
| 2016/0070064 A1 | 3/2016 | Klimowych | |
| 2016/0124143 A1 * | 5/2016 | Jacobsen | G02B 6/0283 |
| | | | 385/127 |
| 2018/0120503 A1 | 5/2018 | Bennett et al. | |
| 2019/0101702 A1 | 4/2019 | Li et al. | |
| 2019/0227235 A1 | 7/2019 | Zheng et al. | |
| 2021/0157062 A1 | 5/2021 | Bickham et al. | |

FOREIGN PATENT DOCUMENTS

| | | |
|---|---|---|
| EP | 1073921 A1 | 2/2001 |
| EP | 2864828 A1 | 4/2015 |
| WO | 98/26317 A1 | 6/1998 |
| WO | 99/54767 A1 | 10/1999 |
| WO | 2004/003612 A1 | 1/2004 |
| WO | 2013/192122 A1 | 12/2013 |

OTHER PUBLICATIONS

Plotnichenko et al., "Influence of Molecular Hydrogen Diffusion on Concentration and Distribution of Hydroxyl Groups in Silica Fibers", Journal of Lightwave Technology, IEEE, vol. 23, No. 1, 2005, pp. 341-347.

Steenberge et al., "Laser Cleaving of Glass Fibers and Glass Fiber Arrays", Journal of Lightwave Technology, vol. 23, No. 2, Feb. 2005, 6 pages.

Wallace, "Fiber Lasers: In some cases, cleaving rather than polishing laser-gain fibers does the trick", Available at: https://www.laserfocusworld.com/lasers-sources/article/14039682/in-some-cases-cleaving-rather-than-polishing-lasergain-fibers-does-the-trick, 2019, 7 pages.

* cited by examiner

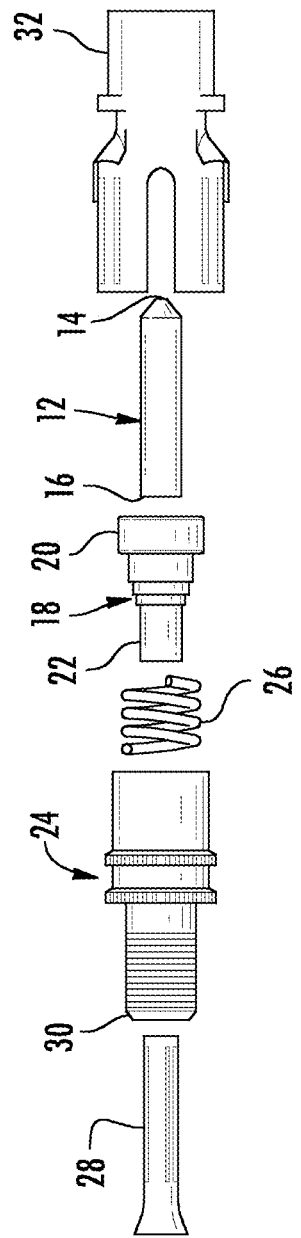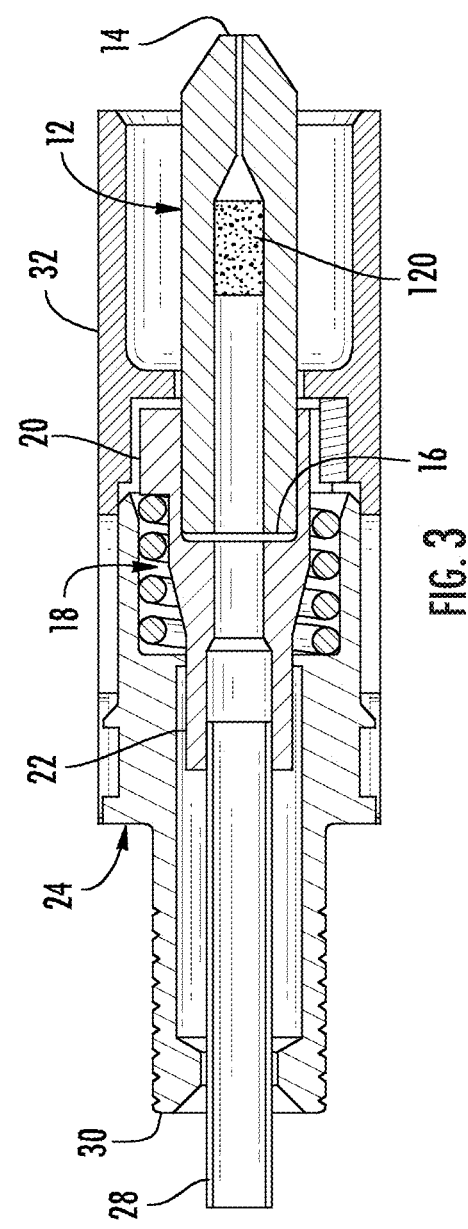

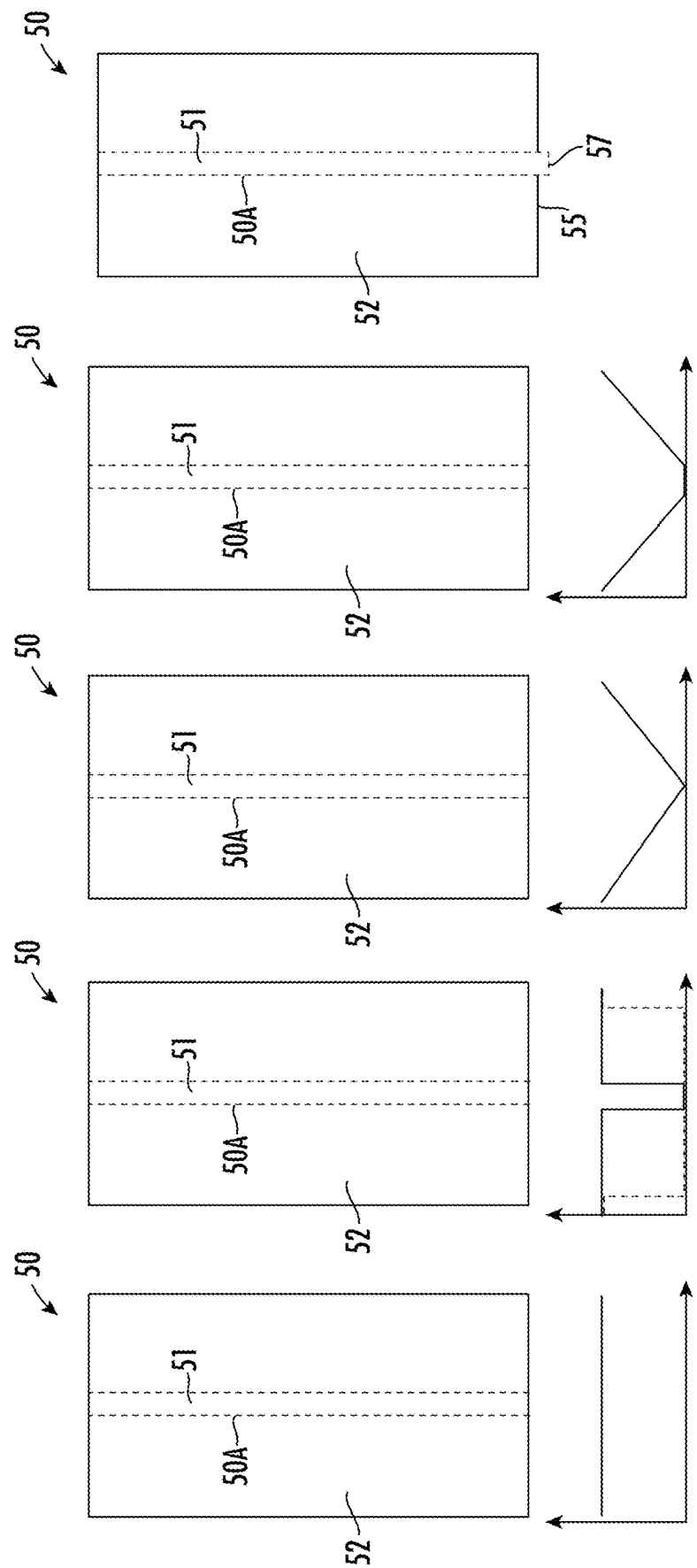

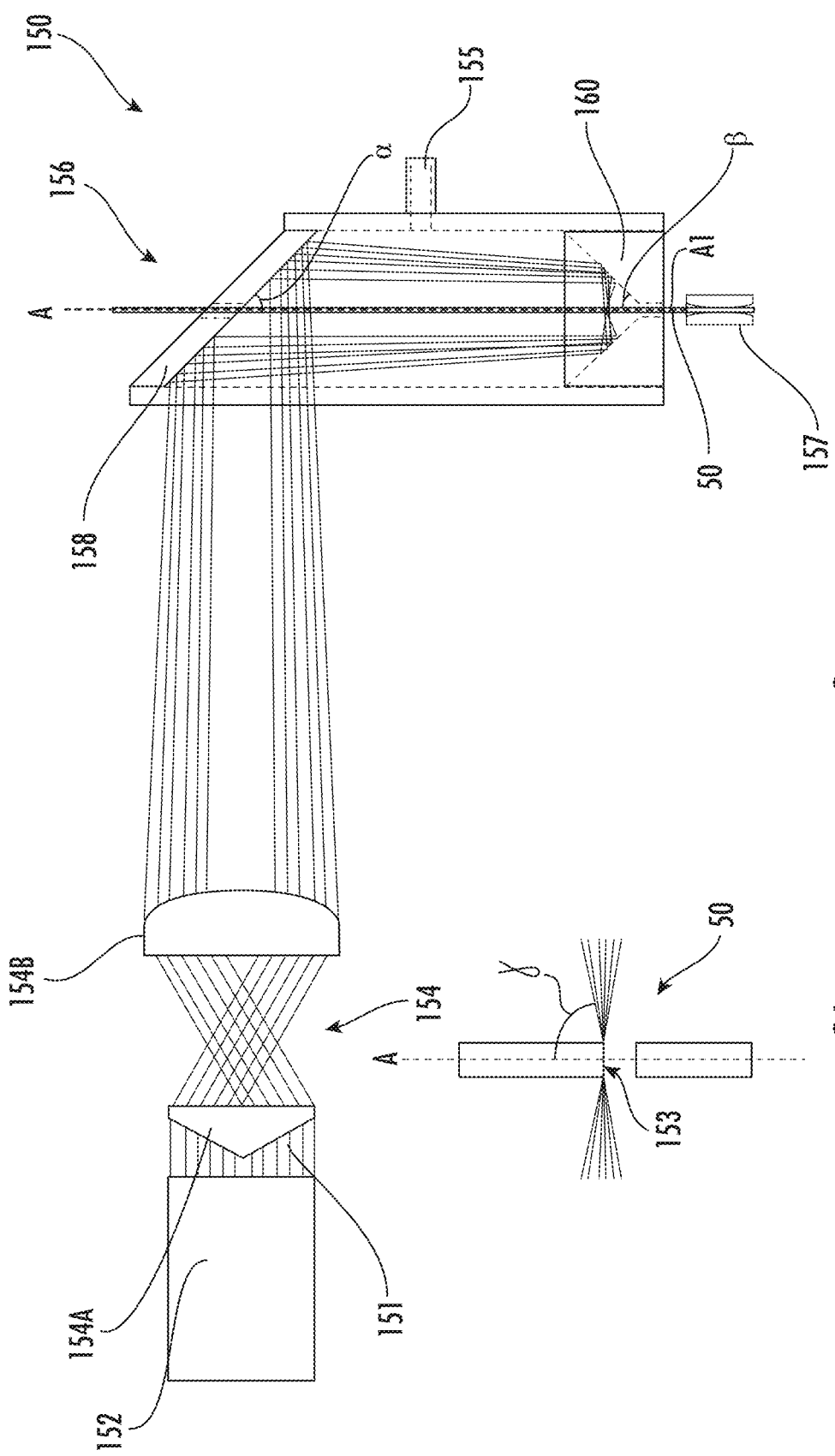

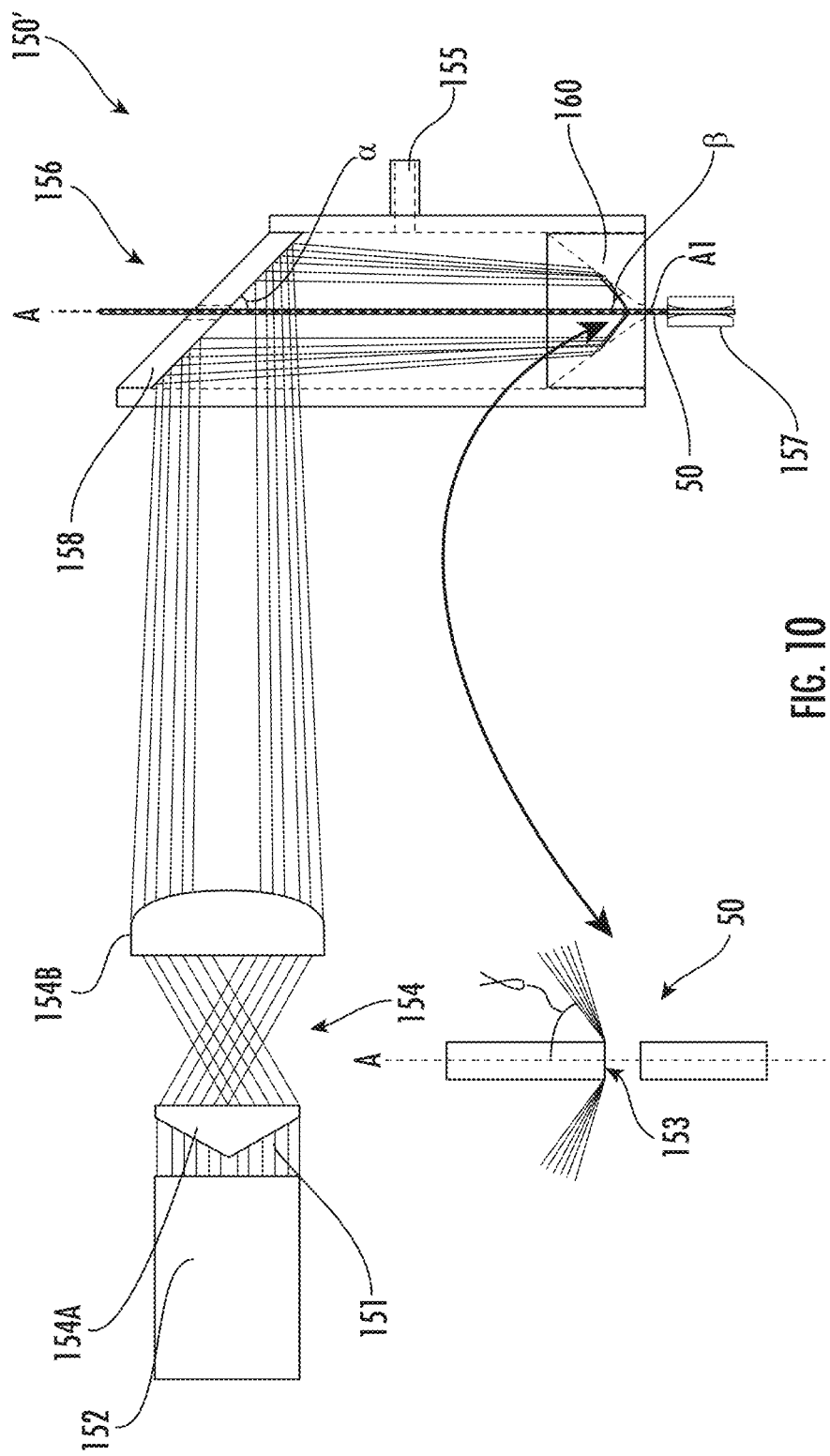

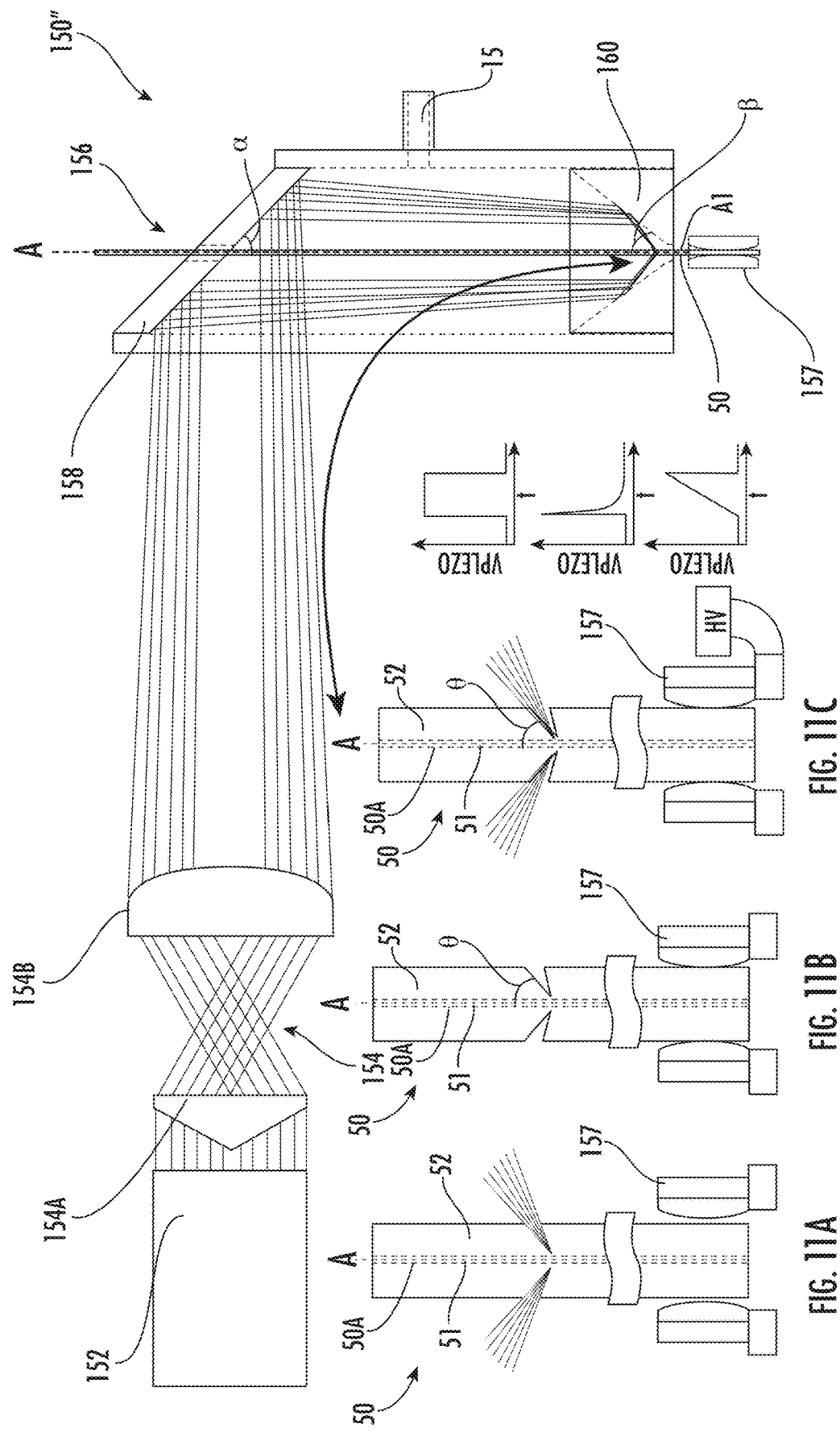

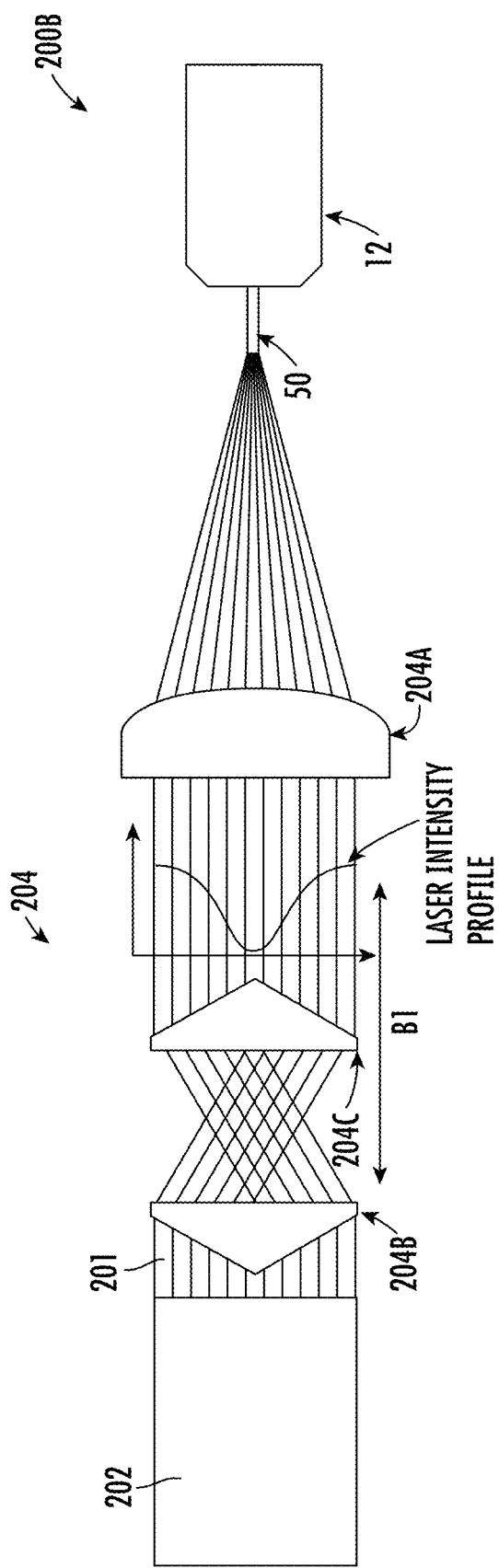

LASER CLEAVING AND POLISHING OF DOPED OPTICAL FIBERS

PRIORITY APPLICATIONS

This application claims the benefit of priority of U.S. Provisional Application No. 63/039,815, filed on Jun. 16, 2020, and U.S. Provisional Application No. 63/117,813, filed on Nov. 24, 2020, the content of which is relied upon and incorporated herein by reference in entirety.

FIELD OF THE DISCLOSURE

This disclosure relates to doped optical fibers and more particularly, to laser cleaving doped optical fibers having a dopant concentration gradient within claddings of the optical fibers.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), an optical fiber in the ferrule is positioned in a known, fixed location relative to the housing. This allows an optical connection to be established when the optical fiber is aligned with another optical fiber provided in the mating connector.

The assembly of connectors involve several steps, including the end preparation of the optical fibers to be connectorized. In general, end preparation involves four main processing steps: (1) stripping the polymer coating to expose a select length of the bare glass fiber; (2) precision cleaving the base glass fiber section with controlled end angles and surface quality; (3) inserting the optical fiber in a ferrule of the connector to have a controlled protrusion distance from the ferrule; and (4) polishing the end of the optical fiber that protrudes from the ferrule. The precision cleaving step may take place before or after inserting the optical fiber in the ferrule. The polishing step aids in removing certain defects from the end face of the optical fiber as well as the end face of the ferrule, such as scratches, pits, digs, as well as adhesives and contaminates, to provide a clean, well-defined mating interface.

The fiber and ferrule end faces are generally flush with each other and in many cases the ferrule end face has a domed geometry with the dome apex intended to be at the center of the optical fiber. Such domed geometry is often referred to as a "physical contact" geometry, and it may be a result of polishing the end face of the ferrule prior to inserting the optical fiber, polishing fiber and ferrule end faces together (e.g., after inserting the optical fiber into the ferrule and securing it relative to the ferrule), or some combination of these approaches. The ferrule, for example, may be polished from every direction equally so that the end face of the ferrule generally has the domed geometry before inserting the optical fiber.

Regardless of the approach, it is important that the polishing step of the connectorization process maintains/achieves the desired precise geometry of the ferrule/fiber end faces. Indeed, in many cases, the fiber and ferrule end faces must conform to relevant industry standards that specify requirements for apex offset (AO), radius of curvature (ROC), and fiber height for different physical contact geometries. Examples of physical contact geometries known in the industry include, but are not limited to, physical contact (PC), angled physical contact (APC), and ultra physical contact (UPC) geometries. Thus, the challenge is to polish down the protrusion of the optical fiber from the ferrule end face to an acceptable height (e.g., within 50 microns of the ferrule end face) and to polish out defects in the optical fiber and ferrule in a manner that does not alter the end face geometries (e.g., the radius of curvature in the case of a domed end face) or the position of the apex. In conventional approaches, this is achieved by engaging the ferrule/fiber end faces with an abrasive element, which may take the form of an abrasive sheet or film, or an abrasive slurry. In order to maintain the end face geometry during the polishing step, it is desirable to polish the ferrule/fiber end faces equally from every direction.

Several approaches have been developed to ensure that polishing occurs equally from every direction. These approaches typically include moving the ferrule/fiber assembly relative to the abrasive element in a certain pattern.

During the polishing process, the abrasive particles used on the abrasive element become dislodged from its surface while glass and ceramic (e.g., the material of the optical fiber and the ferrule) become deposited on the abrasive element. Thus, after some use of the circular path the abrasive element becomes worn and using the same circular path on subsequent ferrule/fiber assemblies may impact the quality of the polishing step and introduce unwanted geometric variations. Accordingly, new abrasive elements may have to be introduced for subsequent assemblies. The abrasive elements, including commercially available abrasive sheets or films, are expensive and the efficient use of the abrasive elements is desired in order to reduce processing costs.

One prior attempt to resolve this issue include introducing an axis of motion to move the center of the circular trace path in a specified direction. While such solutions provide improved usage of the abrasive element, the translational movement produces non-uniformities in the trace patterns on the abrasive element.

Accordingly, manufacturers continue to strive for an improved method of polishing the end faces of connectors, and more particularly the end faces of ferrule/fiber assemblies, in a manner that maintains end face geometries and avoids variations and inconsistencies in polish quality.

SUMMARY OF THE DISCLOSURE

The present disclosure relates to an optical fiber having a core and a cladding, where the cladding is doped with a dopant. The cladding has a dopant concentration gradient in the radial direction such that a concentration of the dopant changes with respect to radial distance from a core-cladding interface. Doping the cladding of the optical fiber enables ablation of the fiber surface with a line source to provide an ablated wedge or crack such that cleaving can be achieved by applying a stress force to the fiber after ablation or by applying a pull force during ablation. The present disclosure also relates to a method of laser cleaving optical fibers to eliminate subsequent polishing steps.

In one embodiment, an optical fiber is provided. The optical fiber comprises: a fiber core comprising glass, the fiber core having a longitudinal axis and a core end face; a cladding surrounding the fiber core to form a core-cladding interface; wherein the cladding comprises glass that is doped with a dopant, wherein the cladding comprises a dopant concentration gradient in the radial direction such that a concentration of the dopant changes with respect to radial distance from the core-cladding interface, and wherein the cladding is configured to absorb a laser beam having a wavelength between 200 nanometers (nm) and 10,600 nm; and wherein the dopant concentration gradient varies such that a first dopant concentration at a first location distal to the core-cladding interface is greater than a second dopant concentration at a second location proximal to the core-cladding interface.

In another embodiment, the dopant is selected from the group consisting of: rare earth metals including Ytterbium and Holmium and transition metals including chromium, vanadium, titanium, manganese, and erbium. In another embodiment, the glass fiber core is proud of the cladding after the cladding absorbs the laser beam. In another embodiment, the fiber end face defined by the core end face and a cladding end face, wherein the fiber end face is convex. In another embodiment, an end face of the optical fiber includes a linear perforation along at least a portion of the end face. In another embodiment, the linear perforation is oriented around a circumference of the optical fiber.

In one embodiment, a method of laser cleaving and polishing an optical fiber, wherein the optical fiber includes a fiber core that comprises glass and a cladding that surrounds the fiber core to form a core-cladding interface, wherein the cladding comprises glass and is doped with a dopant, wherein the cladding comprises a dopant concentration gradient in the radial direction such that a concentration of the dopant changes with respect to radial distance from the core-cladding interface, is provided. The method comprises: emitting a laser beam having a wavelength between 200 nm and 10,600 nm; directing the laser beam to create a perforation along at least a portion of the optical fiber; and propagating the perforation to cleave the optical fiber to create an end face of the optical fiber.

In another embodiment, propagating the perforation comprises applying tension to the optical fiber, wherein the tension is applied to the optical fiber while directing the laser beam. In another embodiment, propagating the perforation comprises applying a vacuum onto the optical fiber to cleave the optical fiber. In another embodiment, directing the laser beam includes a fiber tensioning apparatus comprising an axicon mirror that is angled between 15 degrees and 75 degrees relative to a longitudinal axis of the optical fiber. In another embodiment, the end face of the optical fiber is substantially orthogonal to a longitudinal axis of the optical fiber. In another embodiment, directing the laser beam includes a fiber tensioning apparatus comprising an axicon mirror that is angled between 15 degrees and 75 degrees relative to a longitudinal axis of the optical fiber such that the laser contacts the optical fiber at an angle between 15 degrees and 90 degrees. In another embodiment, the end face of the optical fiber is angled relative to the longitudinal axis of the optical fiber at an angle between 15 degrees and 90 degrees. In another embodiment, the end face of the optical fiber is convex relative to the longitudinal axis of the optical fiber.

In one embodiment, an optical fiber connector assembly is provided. The optical fiber connector assembly comprises: an optical fiber comprising: a fiber core comprising glass, the fiber core having a longitudinal axis; a cladding surrounding the fiber core to form a core-cladding interface; wherein the cladding comprises glass that is doped with a dopant, wherein the cladding comprises a dopant concentration gradient in a radial direction such that a concentration of the dopant changes with respect to radial distance from the core-cladding interface, and wherein the dopant is configured to absorb a laser beam having a wavelength between 200 nm and 10,600 nm and contacting the optical fiber at an angle between 15 degrees and 90 degrees of the longitudinal axis; a ferrule having a front end, a rear end, and a ferrule bore extending from the rear end to the front end; wherein the optical fiber extends through the ferrule bore of the ferrule such that the optical fiber protrudes beyond the front end of the ferrule and the optical fiber has an end face that is convex relative to the longitudinal axis.

In another embodiment, the ferrule has a coefficient of thermal expansion of about $10^{-5}/°$ C. In another embodiment, the ferrule is made of zirconia or ytterbium stabilized zirconia. In another embodiment, an adhesive is housed within the ferrule bore. In another embodiment, the dopant is selected from the group consisting of: rare earth metals including Ytterbium and Holmium and transition metals including chromium, vanadium, titanium, manganese, and erbium. In another embodiment, the concentration of the dopant decreases as a function of the radial distance from the core-cladding interface. In another embodiment, the glass fiber core is proud of the cladding after the cladding absorbs the laser beam. In another embodiment, the end face of the optical fiber includes a linear perforation along at least a portion of the end face. In another embodiment, the linear perforation is oriented around a circumference of the optical fiber.

In one embodiment, a method of laser cleaving and polishing an optical fiber, wherein the optical fiber includes a fiber core that comprises glass and a cladding that surrounds the fiber core to form a core-cladding interface, wherein the cladding comprises glass and is doped with a dopant, wherein the cladding comprises a dopant concentration gradient in a radial direction such that a concentration of the dopant changes with respect to radial distance from the core-cladding interface is provided. The method comprising: emitting a first laser beam having a wavelength between 200 nm and 10,600 nm; directing the laser beam to create a perforation along at least a portion of the optical fiber; and propagating the linear perforation to cleave the optical fiber to create an end face of the optical fiber.

In another embodiment, propagating the linear perforation comprises: emitting a second laser beam having a wavelength between 200 nm and 10,600 nm. In another embodiment, propagating the linear perforation comprises: applying a piezo pulse onto the optical fiber to propagate the linear performation and cleave the optical fiber.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 2 is an exploded view of the connector of FIG. 1;

FIG. 3 is a cross sectional view of the connector of FIG. 1;

FIGS. 7A-7D are dopant profiles of the optical fiber of FIG. 5;

FIG. 8 is a top cross sectional view of the optical fiber of FIG. 5 after laser polishing;

FIG. 9 is a schematic of a laser cleaving apparatus for the optical fiber of FIG. 5;

FIG. 9A is a schematic of the optical fiber of FIG. 5 being laser cleaved by the laser cleaving apparatus of FIG. 9;

FIG. 10 is a schematic of a laser cleaving apparatus for polishing the optical fiber of FIG. 5;

FIG. 10A is a schematic of the optical fiber of FIG. 5 being laser cleaved by the laser cleaving apparatus of FIG. 10;

FIGS. 11 and 11A-11C are schematics of a laser cleaving apparatus and corresponding method of cleaving optical fibers, respectively.

FIG. 14 is a schematic of an alternate laser polishing apparatus for polishing the optical fiber of FIG. 5.

DETAILED DESCRIPTION

Various embodiments will be clarified by examples in the description below. In general, the present disclosure relates to an optical fiber having a core and a cladding, where the cladding is doped with a dopant. The cladding has a dopant concentration gradient in the radial direction such that a concentration of the dopant changes with respect to radial distance from a core-cladding interface. Doping the cladding of the optical fiber enables ablation of the fiber surface with a line source to provide an ablated wedge or crack such that cleaving can be achieved by applying a stress force to the fiber after ablation or by applying a pull force during ablation. The present disclosure also relates to a method of laser cleaving optical fibers to eliminate subsequent polishing steps.

Optical Fiber Connector 10 and Optical Fiber Connector Assembly 100

Figure 1:
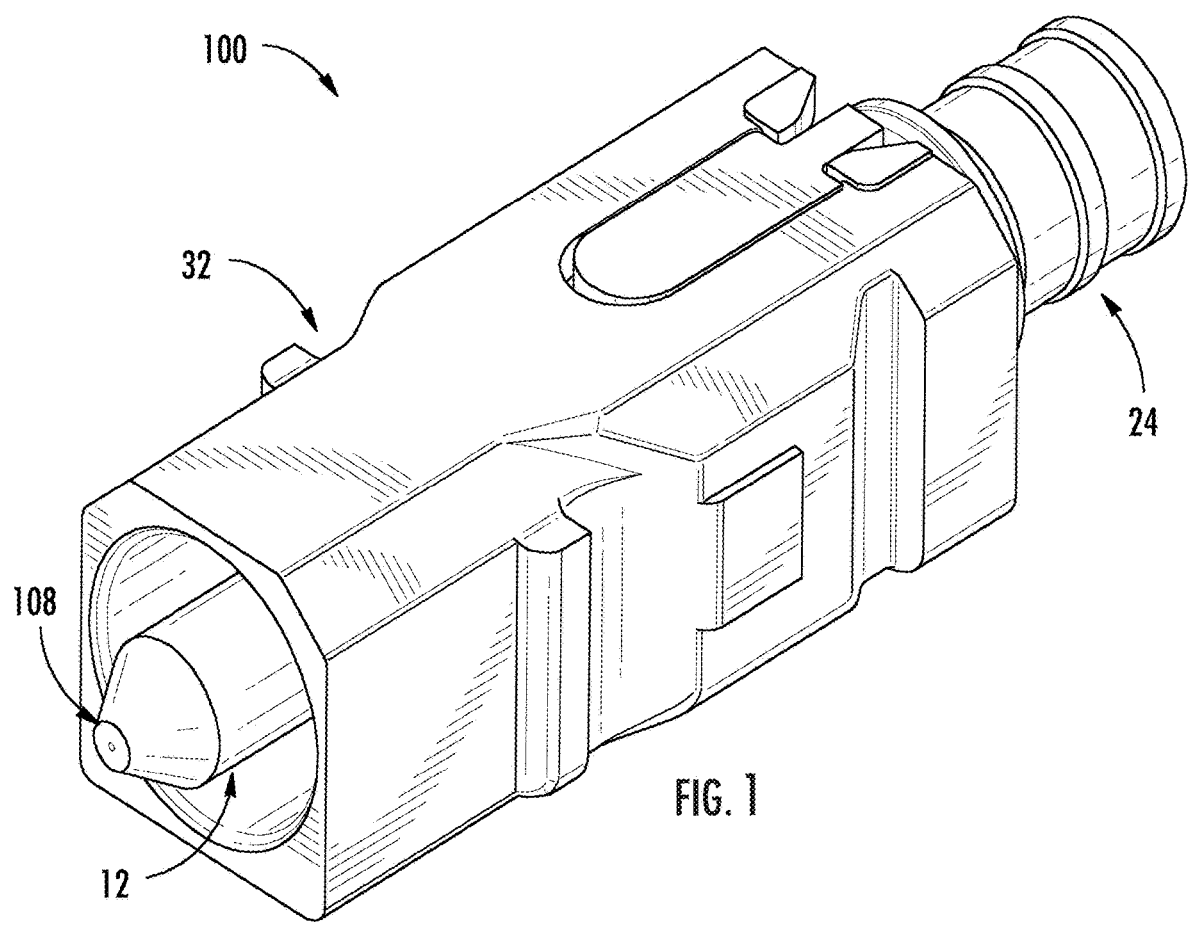
FIG. 1 is a perspective view of an example of an optical fiber connector ("connector")

Referring to FIGS. 1-3, various views of an example of an optical fiber connector 10 are shown. Optical fiber connector 10 is configured to mate an optical fiber 50 (FIG. 5) with another optical fiber (not shown). Although optical fiber connector 10 is shown in the form of an SC-type connector according to IEC 61574-4:2013, this disclosure may be applicable to other connector types, such as LC (e.g., according to IEC 61754-20: 2012) and ST-type connectors (e.g., according to IEC 61754-2:1996). Again, optical fiber connector 10 is merely an example. The same holds true for optical fiber 50, which is merely an example of an optical fiber that can be used in connection with optical fiber connector assembly 100 and associated methods unless otherwise noted.

Figure 6:
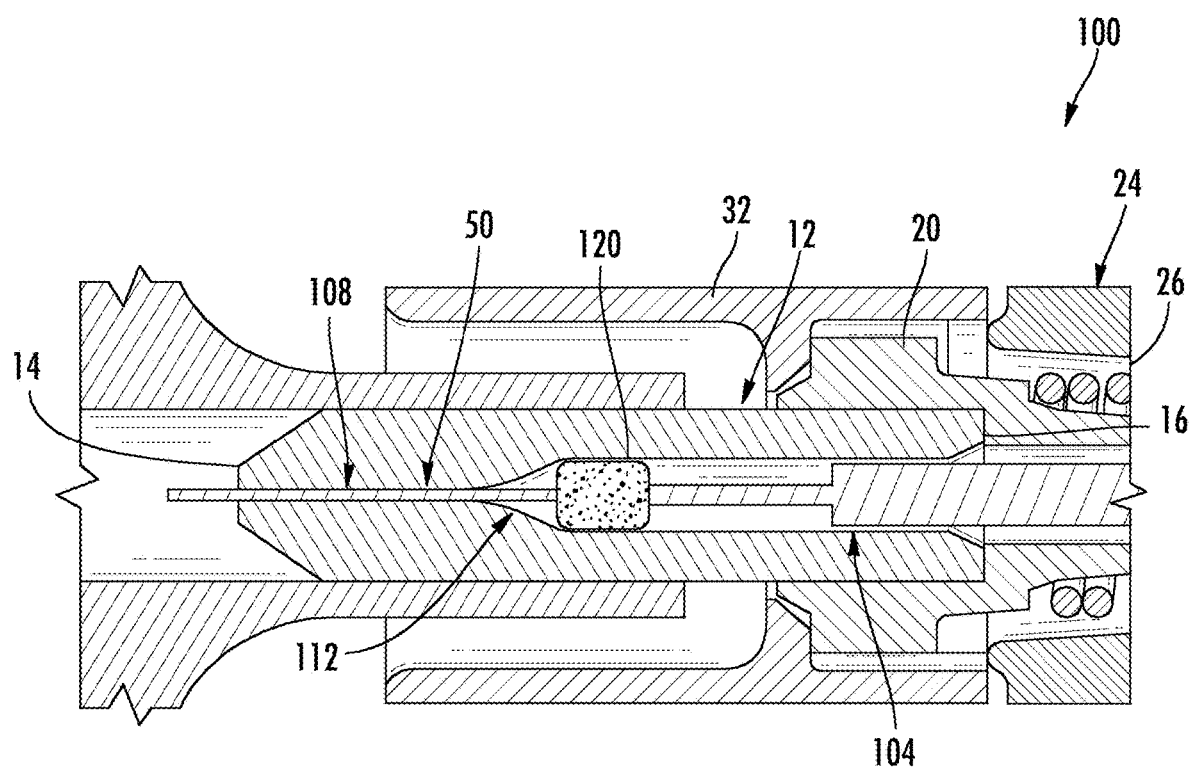
FIG. 6 is a cross sectional view of the connector of FIG. 1 with the optical fiber of FIG. 5 inserted into the connector.

Optical fiber connector 10 includes an inner housing 32 and a housing 24, which are coupled together and house internal components of optical fiber connector assembly 100 (FIG. 6).

Figure 4:
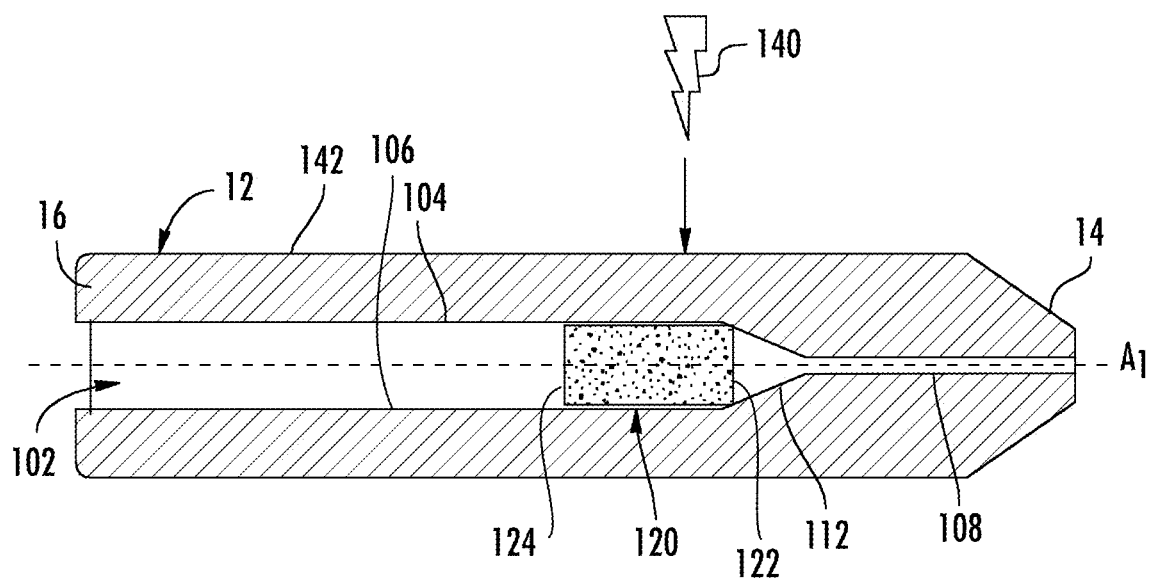
FIG. 4 is a cross sectional view of a ferrule of the connector of FIG. 1 showing heat applied to the ferrule.

Inner housing 32 receives or houses a ferrule 12, a ferrule holder 18, and housing 24. Ferrule 12 includes a front end 14 (also referred to as a mating end) and a rear end 16 (also referred to as an insertion end). Referring now to FIG. 4, an enlarged view of ferrule 12 is shown. Ferrule 12 may be the same as that described in U.S. Pat. No. 8,702,322 ("the '322 patent"), which describes many details related to the geometry of the ferrule, the location of a bonding agent within a bore of the ferrule, and possible compositions for the bonding agent, this information being incorporated herein by reference. In general, ferrule 12 includes a ferrule bore 34 extending between front and rear ends 14, 16 along a longitudinal axis A1. More specifically, the ferrule bore 34 has a first section or counter-bore section 36 extending inwardly from rear end 16 of the ferrule 12, a second section or ferrule microhole 38 (also referred to as "micro-hole" or "micro-hole section") extending inwardly from the front end 14 of the ferrule 12, and a transition section 40 located between the counter-bore section 36 and the ferrule microhole 38. The counter-bore section 36, ferrule microhole 38, and transition section 40 have respective lengths measured along or parallel to the longitudinal axis A1. The front and rear ends 14, 16 define respective front and rear end faces of the ferrule 12 that generally extend in planes parallel or substantially parallel to each other but substantially perpendicular to the longitudinal axis A1. In some embodiments, front end face 14 may be at a slight angle relative to the longitudinal axis A1 to provide, for example, an angled physical contact (APC) end face.

Still referring to FIG. 4, counter-bore section 36 of ferrule bore 34 has a first width, and ferrule microhole 38 has a second width less than the first width such that transition section 40 provides a decrease in width between counter-bore section 36 and ferrule microhole 38. More specifically, in the embodiment shown, counter-bore section 36 of ferrule bore 34 is a cylindrical bore extending from rear end 16 of ferrule 12 to transition section 40 such that the first width is a first diameter. Ferrule microhole 38 of ferrule bore 34 is a cylindrical bore extending from front end 14 of ferrule 12 to transition section 40 such that the second width is a second diameter. Accordingly, transition section 40 provides a decrease in diameter between the first diameter of counter-bore section 36 and the second diameter of ferrule microhole 38.

In some embodiments, ferrule 12 is made of zirconia, ytterbium stabilized zirconia, or like materials. Also, in some embodiments, ferrule 12 has a coefficient of thermal expansion of about $10^{-5}/°C$.

As shown in FIGS. 3 and 4, a bonding agent 42 is located in ferrule bore 34. Bonding agent 42 may be pre-loaded or stored within ferrule 12 (e.g., bonding agent 42 may be pre-loaded into the ferrule bore 34 by the manufacturer of ferrule 12) for a significant amount of time (e.g., at least an hour, a day, a year, etc.) before inserting optical fiber 50 (FIG. 5) into ferrule bore 34. In some embodiments, bonding agent 42 is not included in ferrule bore 34 as discussed below.

The '322 patent describes how the bonding agent 42 may be a free-flowing powder material coupled within transition section 40 of ferrule bore 34 via compression. The '322 patent also mentions that bonding agent 42 may alternatively be extruded.

Although the discussion of possible bonding agents in the '322 patent have been incorporated herein by reference, additional details relating to such bonding agents can be found in U.S. Pat. No. 8,696,215 ("the '215 patent") and U.S. Pat. No. 9,568,686 ("the '686 patent"), such details also being incorporated herein by reference.

Bonding agent 42 is configured to be heated and cooled relatively quickly to facilitate the termination process of a fiber optic cable, yet are also configured to provide sufficient coupling between the optical fiber(s) of a fiber optical cable and the ferrule bore 34. One specific example of bonding agent 42 is one that comprises a partially cross-linked polymer resin and a coupling agent that provides chemical coupling between the polymer resin and optical fiber(s) 50, ferrule 12, or both. The presence of the coupling agent allows the polymer resin to be selected primarily for heating and cooling properties rather than adhesion properties. Bonding agent 42 may even comprise a majority of the polymer resin so as to be largely characterized by the heating and cooling properties of the polymer resin. For example, bonding agent 42 may comprise between about 0.1 to about 10 parts by weight of the coupling agent per 100 parts by weight of the partially cross-linked polymer resin.

As used herein, "cross-linked" or "cross-linking" refers to the chemical bonding that connects a polymer chain to an adjacent polymer chain; "partially cross-linked" is where not all adjacent chains are bonded; and "partially cross-linkable" describes a chemical species that becomes partially cross-linked when sufficient heat is applied. It should be understood that the terms "partially cross-linked" and "partially cross-linkable" describe the same polymer resin before or after partially cross-linking. For example, a polymer resin may be described as partially cross-linkable when it is loaded into a ferrule and has not yet been heated to a temperature that results in the polymer resin partially or completely cross-linking.

One example of a partially cross-linkable polymer resin with desirable heating and cooling characteristics is polyphenylene sulfide. One example of a coupling agent having desirable adhesion characteristics is a coupling agent having a silane functional group, such as one or more of the following: an alkoxysilane, an oxime silane, an acetoxy silane, a zirconate, a titanate, a silane with an epoxy ring on one end and trimethoxy functional group at the other end, or combinations thereof. Other examples of partially cross-linkable polymers, coupling agents, and bonding agents are described in the '322 patent, '215 patent, and '686 patent.

The partially cross-linkable polymer resin of the bonding agent 42 has a melting temperature less than the cross-linking temperature. For example, the partially cross-linkable polymer resins above may each have a melting point at temperatures of less than 250° C., 270° C., or 290° C., yet each have a cross-linking temperature (i.e., the temperature at which the resin materials cross-link in the presence of air) of at least 300° C., 325° C., or even 350° C.

In one embodiment, a cross-linked polymer resin may have a melting point temperature of at least 250° C. or at least 300° C.

As mentioned above, the bonding agent 42 may be a free-flowing powder material at some point. The powder may bay a result of grinding various components of the bonding agent 42 (e.g., the partially cross-linkable resin) that are initially solid in to respective powders, and then mixing powders thoroughly together. Some components of the bonding agent 42 (e.g., the coupling agent) may be a liquid, but the fraction such components in the blend may be relatively small (e.g., less than 10 parts by weight of the overall blend) so that the resulting blend is still considered a free-flowing powder. For example, in one embodiment, the coupling agent may be pre-reacted with the thermoplastic powders in an organic solvent under refluxing conditions. After removal of the solvent, the treated powder remains. Under the conditions of refluxing solvent, some of the coupling agent may have become permanently bonded to the polymer.

In some embodiments, bonding agent 42 has a composition comprising a partially cross-linked resin that is a polymer and a coupling agent that chemically bonds the partially cross-linked resin to an inorganic surface of at least one of the optical fiber and the ferrule.

In some embodiments, bonding agent 42 has a viscosity that is less than 700 Pa·sec, less than 500 Pa·sec, or less than 300 Pa·sec at a heating temperature described herein.

As mentioned previously and referring back to FIGS. 1-3, inner housing 32 receives or houses ferrule holder 18 and housing 24 in addition to ferrule 12. Ferrule holder 18 includes a first end portion 20 and a second end portion 22. First end portion 20 receives rear end 16 of ferrule 12 while front end 14 of ferrule 12 remains outside ferrule holder 18. Second end portion 22 is received in housing 24, and a spring 26 may be disposed around second end portion 22 as discussed herein.

Housing 24 receives second end portion 22 and a lead in tube 28. As mentioned previously, spring 26 may be disposed around second end portion 22 and thereby, received in housing 24. Spring 26 is configured to interact with walls of housing 24 to bias ferrule holder 18 and ferrule 12. Lead in tube 28 extends from a rear end portion 30 of housing 24 to within second end portion 22 of ferrule holder 18 to help guide the insertion of optical fiber 50 (FIG. 5) into ferrule 12.

In a manner not shown herein, a fiber optic cable providing optical fiber 50 (FIG. 5) also includes one or more layers of material (e.g., strength layer of aramid yarn) that may be crimped onto rear end portion 30 of housing 24. A crimp band (or "crimp ring") may be provided for this purpose. Additionally, a strain-relieving boot (not shown) may be placed over the crimped region and extend rearwardly to cover a portion of the fiber optic cable. Variations of these aspects will be appreciated by persons familiar with the design of fiber optic cable assemblies. For example, other ways of securing a fiber optic cable to housing 24 are also known and may be employed in some embodiments. The embodiment shown in FIG. 1 is merely an example of an optical fiber connector assembly 100 to which the fiber optic connector sub-assemblies and methods provided in this disclosure may relate.

Referring now to FIGS. 4 and 6, illustrations of inserting an optical fiber 50 (FIG. 5) to assemble optical fiber connector assembly 100 is provided. To assemble optical fiber connector assembly 100 with an optical fiber 50 (FIG. 5), heat 44 is applied to ferrule 12 to bring ferrule 12 to a heated state. Heat 44 from a heating source (not shown, e.g., a heating port) is applied onto an outer surface 46 of ferrule 12 at a heating temperature such that bonding agent 42 melts and ferrule 12 expands as discussed below. In some embodiments, the heating temperature at which heat 44 is applied onto outer surface 46 is greater than 250° C., greater than 300° C., greater than 350° C., or greater than 400° C. As mentioned previously, when heat 44 is applied onto outer surface 46, ferrule 12 expands. Specifically, counter-bore section 36 and ferrule microhole 38 expand such that counter-bore section 36 expands to a diameter greater than the first diameter and ferrule microhole 38 expands to a diameter greater than the second diameter. In addition, when heated, the diameters of counter-bore section 36 and ferrule microhole 38 are greater than the outer diameter of optical fiber 50 to facilitate insertion of optical fiber 50 within ferrule 12 as discussed below. In comparison to the coefficient of thermal expansion (CTE) of ferrule 12, the CTE of optical fiber 50 (e.g., glass, silica glass, etc.) is small and therefore, the diameter change of optical fiber 50 when heat is applied (to ferrule 12) is small compared to the diameter change of the ferrule microhole 38 and counter-bore section 36. In one embodiment, ferrule microhole 38 has a diameter of between about 123.6 microns and 125.6 microns, which expands to between about 124.3 microns and 126.3 microns in the heated state; and optical fiber 50 has an outer diameter between about 124 microns and 126 microns in either an unheated or heated state.

Once ferrule 12 is in the heated state, optical fiber 50 is inserted into ferrule 12 through rear end 16. Optical fiber 50 is inserted through counter-bore section 36 and through melted bonding agent 42. Optical fiber 50 is also inserted through transition section 40 and through expanded ferrule microhole 38 such that at least a portion of optical fiber 50 protrudes outwardly from front end 14 of ferrule 12 and at least a portion of bonding agent 42 is within ferrule microhole 38. In some embodiments, optical fiber 50 has a protrusion height relative to front end 14 of ferrule 12 ranging between 100 nm and 15 µm, 1 µm and 15 µm, or 5 µm and 10 µm.

After optical fiber 50 is inserted into ferrule 12, heat 44 is no longer applied onto ferrule 12 such that ferrule 12 transitions to a cooled state. In the cooled state, ferrule 12 contracts to substantially its original configuration prior to heating. That is, in the cooled state, counter-bore section 36 and ferrule microhole 38 contract to substantially the first diameter and second diameter, respectively. The contraction of ferrule microhole 38 can result in an interference fit between the previously inserted optical fiber 50 and ferrule microhole 38 with bonding agent 42 between optical fiber 50 and an inner wall of ferrule microhole 38. The interference fit ranges between about 0 microns and −0.5 microns, between about 0 microns and −0.4 microns, or between about 0 microns and −0.3 microns, where the interference fit is determined by subtracting the outer diameter of the optical fiber 50 from the diameter of the ferrule microhole 38 such that values of zero or less (negative values) are associated with interference fits and values above zero are associated with clearance fits as previously discussed.

Advantageously, reducing the diameter of the ferrule microhole (to form an interference fit configuration with optical fiber 50) assists with positioning of optical fiber 50 in ferrule microhole 38 by keeping optical fiber 50 more centered within ferrule 12 thereby, reducing the insertion loss when connecting optical fibers 50 to one another. By contrast, a larger ferrule microhole 38 can result in optical fiber 50 being positioned away from the center of ferrule 12 which can impact the performance of optical fiber connector assembly 100 (e.g., can cause insertion loss).

As mentioned previously, in some embodiments, ferrule 12 does not include bonding agent 42 within ferrule bore 34. In such embodiments, optical fiber 50 (FIG. 5) is inserted directly into ferrule 12 through counter-bore section 36, through transition section 40, and through ferrule microhole 38 such that at least a portion of optical fiber 50 protrudes outwardly from front end 14 of ferrule 12.

Optical Fiber 50

Although the methods described above can be used with different types of optical fibers, certain types of optical fibers provide additional properties discussed below. Referring now to FIGS. 5 and 7A-7D, an optical fiber 50 configured to be inserted into ferrule 12 and optical fiber connector assembly 100 is shown. Optical fiber 50 includes a core 51 and a cladding 52 surrounding core 51 to form a core-cladding interface 50A. Core 51 is composed of materials with an appropriate refractive index differential to provide desired optical characteristics.

Figure 5:
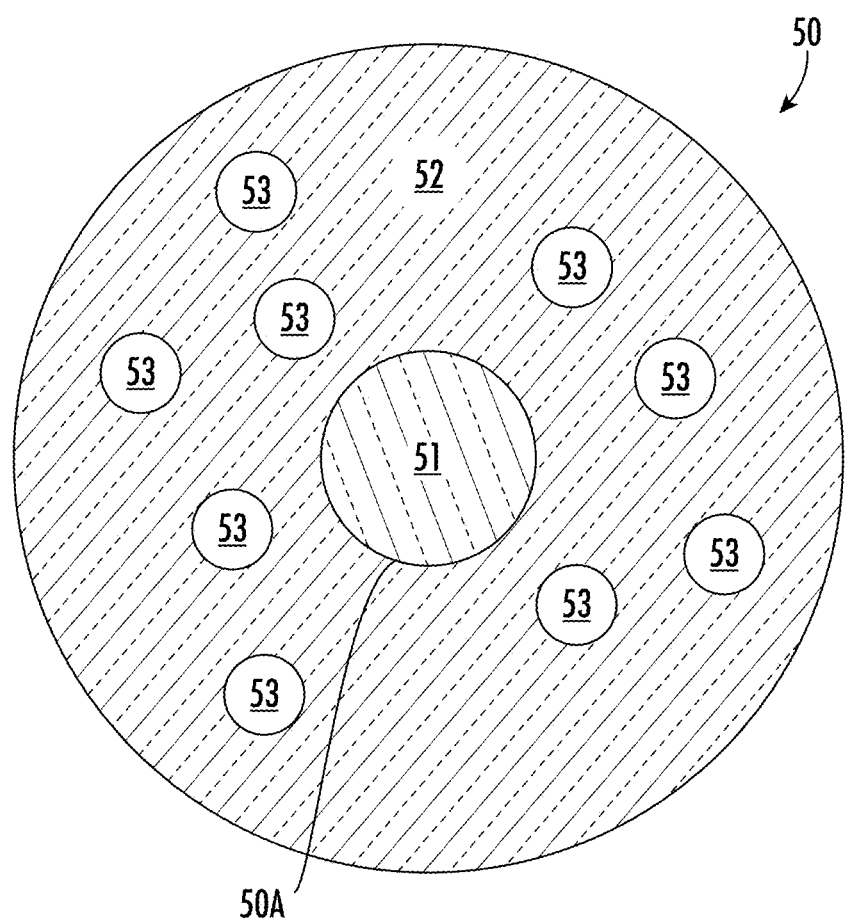
FIG. 5 is a cross sectional view of an example of an optical fiber having a doped cladding.

Cladding 52 includes all glass portions (e.g., silica glass) of an optical fiber 50 outside core 51 and is not limited to glass portions of optical fiber 50 outside of core 51 which are optically functional. As shown in FIG. 5, cladding 52 is doped with a dopant 53 throughout cladding 52. Dopant 53 is comprised of either rare earth metals or transition metals. In some embodiments, rare earth metals include Ytterbium and Holmium and transition metals include Chromium, Vanadium, Titanium, Manganese, and Erbium.

Cladding 52 doped with dopant 53 (also referred to as "doped cladding 52") is configured to absorb laser pulses (as discussed in greater detail below) of laser beam 151, 201 (FIGS. 8 and 9) having wavelengths ranging between 200 nanometers (nm) and 10,600 nm, 225 nm and 2,000 nm, 250 nm and 1,750 nm, 375 nm and 1,100 nm, or 515 nm and 1080 nm. As used herein, "absorb" means at least 10% of light is absorbed instead of reflected from or transmitted through optical fiber 50. In general, the dopant concentration within optical fiber 50 ranges between 50 parts per million by weight (ppm) and 20 wt. %, 5 wt. % and 15 wt. %, or 7 wt. % and 12 wt. % relative to the weight of cladding 52. In particular, in some embodiments where dopant 53 comprises titania and/or rare earth metals, the dopant concentration within optical fiber 50 ranges between 50 parts per million by weight (ppm) and 20 wt. %, 5 wt. % and 15 wt. %, or 7 wt. % and 12 wt. % relative to the weight of cladding 52. In some embodiments where dopant 53 comprises transition metals, the dopant concentration within optical fiber 50 ranges between 500 parts per million by weight (ppm) and 3 wt. % or 0.5 wt. % and 2 wt. % relative to the weight of cladding 52.

The concentration of dopant 53 varies radially within cladding 52 relative to the distance from core-cladding interface 50A. Referring now to FIGS. 7A-7D, various dopant concentration profiles are shown within cladding 52 and/or core 51 of optical fiber 50. The dopant concentration profiles are shown as varying radially (or in the radial direction) within optical fiber 50 relative to the center of optical fiber 50. However, it is contemplated and within the scope of the present disclosure that the dopant concentration varies within optical fiber 50 in other suitable ways. Referring first to FIG. 7A, the dopant concentration profile of optical fiber 50 is uniform throughout the entirety of optical fiber 50. Stated another way, the concentration of dopant 53 is constant throughout cladding 52 and core 51. In FIG. 7B, the concentration of dopant 53 is uniform throughout cladding 52 but not present within core 51. That is, beyond core-cladding interface 50A (i.e., within core 51), the concentration of dopant 53 is substantially zero. As also shown in FIG. 7B, the concentration of dopant 53 can be present in an outermost portion of cladding 52 as indicated by the curve shown in broken lines. Stated another way, dopant 53 can be present in an outermost portion of cladding 52 extending inwardly from the outer surface of optical fiber 50 for at last a portion of cladding 52. In some embodiments, the concentration of dopant 53 is present in an outermost portion of cladding 52 where the outermost portion of cladding 52 extends inward from the outer surface of optical fiber 50 (towards core 51) by at least 5 μm within cladding 52 or extends to within 20 μm of core 51.

In FIG. 7C, a dopant concentration profile throughout optical fiber 50 is shown where a dopant concentration gradient within cladding 52 and core 53 of optical fiber 50 such that the dopant concentration decreases from the outer surface (where there is maximum concentration of dopant 53) of optical fiber 50 to core 53. Finally, in FIG. 7D, the concentration profile of dopant 53 is tapered in cladding 52 until core-cladding interface 50A where the concentration of dopant 53 is substantially zero, and the dopant concentration within core 53 is also substantially zero. Stated another way, in FIG. 7D, there is a dopant concentration gradient within cladding 52 where the dopant concentration decreases from the outer surface (maximum concentration of dopant 53) of optical fiber 50 to core-cladding interface 50A.

Advantageously, the use of dopant 53 enables the use of nanosecond lasers to ablate optical fibers 50 in accordance with the present disclosure which reduces cost when the pulse duration of laser 152 (FIGS. 9-11) is at or above 0.5 nanoseconds.

The variation in dopant concentration within cladding 52 enables cladding 52 to be laser treated during both laser cleaving and laser polishing processes. During laser cleaving, dopant 53 of doped cladding 52 absorbs laser beam 151 to form a crack or perforation in doped cladding 52. Due to the dopant concentration gradient present in cladding 52 (discussed above, FIG. 7C or 7D), dopant 53 absorbs a greater amount of the laser beam 151 at a distal location within cladding 52 relative to core-cladding interface 50A— where a greater concentration of dopant 53 is present. In this way, dopant 53 of cladding 52 prevents the crack or perforation from propagating radially inwards to core 51, and thus, core 51 is substantially unaffected by laser beam 151.

During laser polishing, similar to laser cleaving, variation in dopant concentration within cladding 52 limits laser ablation relative to radial distance to core 51 (i.e., relative to core-cladding interface 50A). That is, a greater amount of laser ablation occurs at locations distal to core-cladding interface (e.g., closer to outer edge of cladding 52) due to a greater concentration of dopant 53 as compared to locations closer to core-cladding interface 50A. In this way, optical fiber endface 55 can be shaped into a core to cladding configuration discussed below. In addition, due to the use of laser pulses (discussed below) and the low wavelength absorption properties of dopant 53, laser polishing of optical fiber 50 can be performed without distorting optical fiber endface 55 of optical fiber 50 (e.g., "mushrooming" of optical fiber 50 and/or expansion of the outer diameter of optical fiber 50).

As mentioned previously, the dopant concentration profile within optical fiber 50 yields a core to cladding configuration upon laser absorption. In particular, upon laser absorption, the core to cladding configuration changes as optical fiber endface 55 is laser ablated such that cladding 52 recedes relative to core 51 and core 51 is proud of cladding 52 as shown in FIG. 8. In the context of the present disclosure, "proud" refers to a configuration where core 51 extends beyond endface 55 of cladding 52 as shown in FIG. 8. Stated another way, in the context of the present disclosure, "proud" refers to a configuration where an endface 57 of core 51 extends beyond an endface 55 of cladding 52 as shown in FIG. 8. In addition, the apex offset of optical fiber 50 is in substantial alignment after laser absorption. That is, upon laser absorption, the profile of optical fiber 50 is substantially centered around core 51, i.e., the location of the apex of the profile of optical fiber 50.

Laser Cleaving Apparatus 150

Referring now to FIG. 9, a laser cleaving apparatus 150 that is used to laser treat/process optical fiber 50 is shown. Laser cleaving apparatus 150 includes laser 152, lens apparatus 154, and fiber tensioning apparatus 156.

Laser 152 is configured to emit a laser beam 151 to cleave optical fiber 50. In some embodiments, laser 152 is a collimated, an ultrafast laser, or a $CO_2$ laser. However, it is within the scope of the present disclosure that alternate suitable lasers may be used. In some embodiments, laser 152 emits laser beam 151 at various wavelengths ranging between 200 nanometers (nm) and 10,600 nm, 225 nm and 2,000 nm, or 250 nm and 1,750 nm. In one embodiment, laser beam 151 has a wavelength of between about 524 nm to about 527 nm. In some embodiments, laser 102 emits laser beam 120 at a pulse width between 0.19 picoseconds (ps) and 200,000 ps, 0.29 ps and 10,000 ps, or 10 ps and 1,000 ps. In one embodiment, the pulse width of laser beam 151 emitted from laser 152 is 350 ps. In some embodiments, laser 152 emits laser beam 151 at a repetition rate ranging between 0.01 kilohertz (kHz) and 80,000 kHz, 0.1 kHz and 10,000 kHz, or 0.1 kHz and 1,000 kHz. In one embodiment, laser 152 emits laser beam 151 at a repetition rate of 100 Hz. In some embodiments, laser 152 emits laser beam 151 at an output power ranging between 10 milliwatts (mW) and 50 W, 10 mW and 20 W, or 10 mW and 10 W with a corresponding actual laser energy used for perforating an optical fiber ranging between 1 μJ per pulse and 1,000 μJ per pulse. In one embodiment, laser 152 emits laser beam 151 at an output power of between about 20 mW to about 30 mW with a corresponding actual laser energy used for perforating an optical fiber of about 200 μJ per pulse to 300 μJ per pulse.

As shown in FIG. 9, laser beam 151 passes through lens apparatus 154 after laser beam 151 is emitted from laser 152. Lens apparatus 154 includes an axicon lens 154A and an aspheric lens 154B. Axicon lens 154A is configured to invert a laser beam intensity profile of laser beam 151 and diverge laser beam 151, and aspheric lens 154B is configured to alter the laser beam intensity profile of laser beam 151 to a converging profile and to direct laser beam 151 to fiber tensioning apparatus 156. In some embodiments, aspheric lens 154B is another axicon lens.

Fiber tensioning apparatus 156 is configured to hold doped optical fiber 50 under tension while undergoing laser treatment/processing as described herein. In some embodiments, optical fiber 50 is held under tension by a rubber gripper 157 with the tension ranging between 0.1 Newton (N) and 40 N, 0.5 N and 20 N, or 1 N and 10 N. Fiber tensioning apparatus 156 includes an elliptical mirror 158 and an axicon mirror 160. Elliptical mirror 158 is configured to direct laser beam 151 within fiber tensioning apparatus 156. As shown in FIG. 9, elliptical mirror 158 is angled relative to longitudinal axis A of optical fiber 50. In some embodiments, elliptical mirror 158 has an angle α relative to longitudinal axis A that ranges between 15 degrees and 75 degrees, 30 degrees and 60 degrees, or 40 degrees and 50 degrees. In some embodiments, angle α is about 45 degrees relative to longitudinal axis A of optical fiber 50. Axicon mirror 160 is positioned around optical fiber 50 and is configured to direct laser beam 151 onto optical fiber 50 to create a laser perforation on optical fiber 50 as discussed below. In some embodiments, axicon mirror 160 can be an aspheric mirror or a parabolic mirror. As shown in FIG. 9, axicon mirror 160 is angled relative to longitudinal axis A of optical fiber 50. In some embodiments, angle β ranges between 15 degrees and 75 degrees, 30 degrees and 60 degrees, or 40 degrees and 50 degrees. In some embodiments, angle β is about 45 degrees relative to longitudinal axis A of optical fiber 50. When laser beam 151 reflects off axicon mirror 151, laser beam 151 impacts optical fiber 50 at an angle γ (FIG. 9A) about the circumference of optical fiber 50 such that cladding 52 is ablated to create a crack or perforation about the circumference or perimeter of optical fiber 50 according to the dopant patterns described above. In some embodiments, angle γ is substantially perpendicular to longitudinal axis A. After ablation, the tension applied by rubber gripper 157 onto optical fiber 50 by fiber tensioning apparatus 150 propagates the crack or perforation such that the crack or perforation propagates toward core 51 of optical fiber 50 or longitudinal axis A of optical fiber 50, and optical fiber 50 is cleaved along the crack or perforation formed by laser ablation as discussed above. In some embodiments, a vacuum is applied (via a vacuum fitting 155, shown in FIGS. 9-11) onto optical fiber 50 and fiber tensioning apparatus 156 such that optical fiber 50 is self-centered relative to a central axis of axicon mirror 160 (axis A1) whereby axis A1 and axis A are substantially aligned by the Bernoulli Effect from air flowing through apertures in elliptical mirror 158 and axicon mirror 160. Such self-centering enables that every optical fiber 50 is processed the same way in laser cleaving apparatus 150. In addition, the ablated glass is pulled away from axicon mirror 160 and out of fiber tensioning apparatus 156, thereby preventing contamination of the surface of axicon mirror 160. In some embodiments, a level of vacuum applied to optical fiber 50 is dependent on the diameters of corresponding apertures of elliptical mirror 158 and axicon mirror 160.

To operate laser cleaving apparatus 150, an optical fiber 50 is placed and secured onto fiber tensioning apparatus 156 under tension by rubber gripper 157. Then, laser 152 is activated to emit laser beam 151. In one embodiment, laser 152 emits laser beam 151 at a wavelength of between about 524 nm to about 527 nm, a pulse width of 350 ps, a repetition rate of 100 kHz, and an output power of between about 20 mW to about 30 mW. Laser beam 151 is emitted from laser 152 and travels throughout lens apparatus 154 as shown in FIG. 9 (i.e., passing through axicon lens 154A and aspheric lens 154B to alter the laser beam intensity profile of laser beam 151 and direct laser beam 151 to fiber tensioning apparatus 156). Upon entering fiber tensioning apparatus 156, laser beam 151 reflects off elliptical mirror 158 and is directed to axicon mirror 160 where laser beam 151 is reflected onto optical fiber 50 to create a crack or perforation(s) on optical fiber ribbon 124 about the circumference of optical fiber 50. Optical fiber 50 is then cleaved along the crack or perforation by the tension applied onto optical fiber 50 by fiber tensioning apparatus 156.

FIG. 9A shows a cleaved optical fiber 50 that has been laser cleaved by laser cleaving apparatus 150. Due to the angle of axicon mirror 160 of fiber tensioning apparatus 156, laser beams 151 perforate optical fiber 50 such that cleaved optical fiber 50 has a flat and substantially orthogonal (relative to longitudinal axis A) end face 153.

Laser Cleaving Apparatus 150'

Referring now to FIG. 10, an alternate laser cleaving apparatus 150' that is used to laser treat/process optical fiber 50 is shown. Laser cleaving apparatus 150' is substantially the same as laser cleaving apparatus 150 except as noted below.

Laser 152 is configured to emit a laser beam 151 to cleave optical fiber 50. In some embodiments, laser 152 is a collimated or an ultrafast laser. However, it is within the scope of the present disclosure that alternate suitable lasers may be used. In some embodiments, laser 152 emits laser beam 151 at various wavelengths ranging between 200 nanometers (nm) and 10,600 nm, 225 nm and 2,000 nm, or 250 nm and 1,750 nm. In one embodiment, laser beam 151 has a wavelength of between about 524 nm to 527 nm. In some embodiments, laser 102 emits laser beam 120 at a pulse width between 0.19 picoseconds (ps) and 200,000 ps, 0.29 ps and 10,000 ps, or 10 ps and 1,000 ps. In one embodiment, the pulse width of laser beam 151 emitted from laser 152 is 350 ps. In some embodiments, laser 152 emits laser beam 151 at a repetition rate ranging between 0.01 kilohertz (kHz) and 80,000 kHz, 0.1 kHz and 10,000 kHz, or 0.1 kHz and 1,000 kHz. In one embodiment, laser 152 emits laser beam 151 at a repetition rate of 100 kHz. In some embodiments, laser 152 emits laser beam 151 at an output power ranging between 10 milliwatts (mW) and 50 W, 10 mW and 20 W, or 10 mW and 10 W with a corresponding actual laser energy used for perforating an optical fiber ranging between 1 μJ per pulse and 1,000 μJ per pulse. In one embodiment, laser 152 emits laser beam 151 at an output power of between about 20 mW to about 30 mW with a corresponding actual laser energy used for perforating an optical fiber of between about 200 μJ per pulse to about 300 μJ per pulse.

As shown in FIG. 10, laser beam 151 passes through lens apparatus 154 after laser beam 151 is emitted from laser 152. Lens apparatus 154 includes an axicon lens 154A and an aspheric lens 154B. Axicon lens 154A is configured to invert a laser beam intensity profile of laser beam 151 and diverge laser beam 151, and aspheric lens 154B is configured to alter the laser beam intensity profile of laser beam 151 to a converging profile and to direct laser beam 151 to fiber tensioning apparatus 156.

Fiber tensioning apparatus 156 is configured to hold doped optical fiber 50 under tension while undergoing laser treatment/processing as described herein. In some embodiments, optical fiber 50 is held under tension by a rubber gripper 157 with the tension ranging between 0.1 Newton (N) and 40 N, 0.5 N and 20 N, or 1 N and 10 N. Fiber tensioning apparatus 156 includes an elliptical mirror 158 and an axicon mirror 160. Elliptical mirror 158 is configured to direct laser beam 151 within fiber tensioning apparatus 156. As shown in FIG. 10, elliptical mirror 158 is angled relative to longitudinal axis A of optical fiber 50. In some embodiments, elliptical mirror 158 has an angle α relative to longitudinal axis A that ranges between 15 degrees and 75 degrees, 30 degrees and 60 degrees, or 40 degrees and 50 degrees. In some embodiments, angle α is about 45 degrees relative to longitudinal axis A of optical fiber 50. Axicon mirror 160 is positioned around optical fiber 50 and is configured to direct laser beam 151 onto optical fiber 50 to create a laser perforation on optical fiber 50 as discussed below. As shown in FIG. 10, axicon mirror 160 is angled relative to longitudinal axis A of optical fiber 50. In some embodiments, angle β ranges between 15 degrees and 75 degrees, 30 degrees and 60 degrees, or 30 degrees and 55 degrees. In some embodiments, angle β is about 35 degrees relative to longitudinal axis A of optical fiber 50. The variation of angle β in laser cleaving apparatus 150' causes the flaw (e.g., crack or perforation) to initially grow towards longitudinal axis A, but eventually turn to be orthogonal to longitudinal axis A of optical fiber 50 as the flaw approaches longitudinal axis A yielding a convex shaped end face 153 of optical fiber 50 where core 51 protrudes beyond end face 153. Stated another way, the variation of angle β in laser cleaving apparatus 150' causes laser beam 151 (i.e., ring of laser beam 151) to contact the surface of optical fiber 50 at an angle γ to cause the flaw (e.g., crack, or line source) to also be angled (angle θ, FIG. 11B, where angle θ is substantially equal to angle γ) relative to a longitudinal axis A of optical fiber 50 as shown in FIG. 10A. In some embodiments, angle γ of flaw on optical fiber 50 relative to longitudinal axis A of optical fiber 50 ranges between 15 degrees and 90 degrees, 30 degrees and 80 degrees, or 45 degrees and 70 degrees.

When laser beam 151 reflects off axicon mirror 151, laser beam 151 impacts optical fiber 50 about the circumference of optical fiber 50 such that cladding 52 is ablated to create a crack or perforation (e.g., a line source) about the circumference or perimeter of optical fiber 50 according to the dopant patterns described above. After ablation, the tension applied by rubber gripper 157 onto optical fiber 50 by fiber tensioning apparatus 150 propagates the crack or perforation such that optical fiber 50 is cleaved along the crack or perforation formed by laser ablation as discussed above.

To operate laser cleaving apparatus 150, an optical fiber 50 is placed and secured onto fiber tensioning apparatus 156 under tension by rubber gripper 157. Then, laser 152 is activated to emit laser beam 151. In one embodiment, laser 152 emits laser beam 151 at a wavelength of between about 524 nm to about 527 nm, a pulse width of 350 ps, a repetition rate of 100 kHz, and an output power of between about 20 mW to about 30 mW. Laser beam 151 is emitted from laser 152 and travels throughout lens apparatus 154 as shown in FIG. 10 (i.e., passing through axicon lens 154A and aspheric lens 154B to alter the laser beam intensity profile of laser beam 151 and direct laser beam 151 to fiber tensioning apparatus 156). Upon entering fiber tensioning apparatus 156, laser beam 151 reflects off elliptical mirror 158 and is directed to axicon mirror 160 where laser beam 151 is reflected onto optical fiber 50 to create a crack or perforation(s) on optical fiber ribbon 124 about the circumference of optical fiber 50. Optical fiber 50 is then cleaved along the crack or perforation by the tension applied onto optical fiber 50 by fiber tensioning apparatus 156.

FIG. 10A shows a cleaved optical fiber 50 that has been laser cleaved by laser cleaving apparatus 150'. Due to the angle of axicon mirror 160 of fiber tensioning apparatus 156 and the resulting configuration of laser beams 151, laser beams 151 perforate optical fiber 50 such that cleaved optical fiber 50 has a convex shaped end face 153 with an apex 153A coincident with longitudinal axis A.

Figure 12:
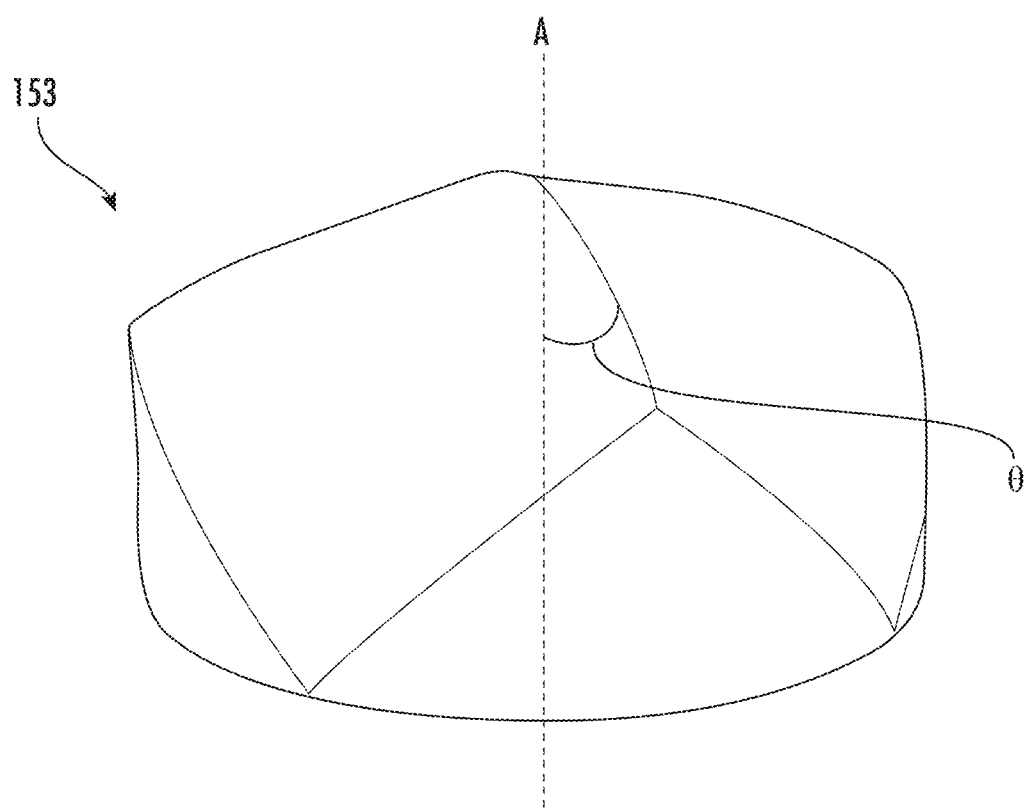
FIG. 12 is a perspective view of a cleaved end face of the optical fiber of FIG. 5 after laser cleaving with the laser cleaving apparatus of FIG. 10.

In some embodiments, laser beams 151 of laser cleaving apparatuses 150, 150' may not create a deep enough flaw on optical fiber 50 for a cleave to occur. In these embodiments, multiple focused spots or shot lines could be used to achieve higher power density. For example, laser beam 151 can be split into four beams which can be aimed at optical fiber 50 from four sides using a combination of flat mirrors and prisms. The four beams could then be focused into four tight spots or short lines on optical fiber 50 (i.e., separated by 90 degrees around the circumference of optical fiber 50). The resulting configuration of end face 153 of optical fiber 50 is shaped as shown in FIG. 12. In some embodiments, at least three spots or lines are needed to create a convex shaped end face 153 with apex 153A coincident with longitudinal axis A.

Laser Cleaving Apparatus 150"

Referring now to FIG. 11, an alternate laser cleaving apparatus 150" that is used to laser treat/process optical fiber 50 is shown. Laser cleaving apparatus 150" is substantially the same as laser cleaving apparatus 150 except as noted below.

Laser 152 is configured to emit a laser beam 151 to cleave optical fiber 50. In some embodiments, laser 152 is a collimated or an ultrafast laser. However, it is within the scope of the present disclosure that alternate suitable lasers may be used. In some embodiments, laser 152 emits laser beam 151 at various wavelengths ranging between 200 nanometers (nm) and 10,600 nm, 375 nm and 1,100 nm, or 515 nm and 1080 nm. In one embodiment, laser beam 151 has a wavelength of about 1030 nm. In some embodiments, laser 102 emits laser beam 120 at a pulse width between 0.19 picoseconds (ps) and 200,000 ps, 0.29 ps and 10,000 ps, or 10 ps and 1,000 ps. In one embodiment, the pulse width of laser beam 151 emitted from laser 152 is 400 ps. In some embodiments, laser 152 emits laser beam 151 at a repetition rate ranging between 0.01 kilohertz (kHz) and 80,000 kHz, 0.1 kHz and 10,000 kHz, or 1 kHz and 1,000 kHz. In one embodiment, laser 152 emits laser beam 151 at a repetition rate of 50 kHz. In some embodiments, laser 152 emits laser beam 151 at an output power ranging between 0.2 Watts (W) and 50 W, 1 W and 20 W, or 2 W and 10 W with a corresponding actual laser energy used for perforating an optical fiber ranging between 1 µJ per pulse and 1,000 µJ per pulse. In one embodiment, laser 152 emits laser beam 151 at an output power of about 5 W with a corresponding actual laser energy used for perforating an optical fiber of about 50 µJ per pulse.

As shown in FIG. 11, laser beam 151 passes through lens apparatus 154 after laser beam 151 is emitted from laser 152. Lens apparatus 154 includes an axicon lens 154A and an aspheric lens 154B. Axicon lens 154A is configured to invert a laser beam intensity profile of laser beam 151 and diverge laser beam 151, and aspheric lens 154B is configured to alter the laser beam intensity profile of laser beam 151 to a converging profile and to direct laser beam 151 to fiber tensioning apparatus 156.

Fiber tensioning apparatus 156 is configured to hold doped optical fiber 50 under tension while undergoing laser treatment/processing as described herein. In some embodiments, optical fiber 50 is held under tension ranging between 0.1 Newton (N) and 40 N, 0.5 N and 20 N, or 1 N and 10 N. Fiber tensioning apparatus 156 includes an elliptical mirror 158 and an axicon mirror 160. Elliptical mirror 158 is configured to direct laser beam 151 within fiber tensioning apparatus 156. As shown in FIG. 11, elliptical mirror 158 is angled relative to longitudinal axis A of optical fiber 50. In some embodiments, elliptical mirror 158 has an angle α relative to longitudinal axis A that ranges between 15 degrees and 75 degrees, 30 degrees and 60 degrees, or 40 degrees and 50 degrees. In some embodiments, angle α is about 45 degrees relative to longitudinal axis A of optical fiber 50. Axicon mirror 160 is positioned around optical fiber 50 and is configured to direct laser beam 151 onto optical fiber 50 to create a laser perforation on optical fiber 50 as discussed below. As shown in FIG. 11, axicon mirror 160 is angled relative to longitudinal axis A of optical fiber 50. In some embodiments, angle β ranges between 15 degrees and 75 degrees, 30 degrees and 60 degrees, or 30 degrees and 55 degrees. In some embodiments, angle β is about 45 degrees relative to longitudinal axis A of optical fiber 50. As discussed herein, when laser beam 151 reflects off axicon mirror 151, laser beam 151 impacts optical fiber 50 about the circumference of optical fiber 50 such that cladding 52 is ablated to create a crack or perforation or flaw about the circumference or perimeter of optical fiber 50 according to the dopant patterns described above.

Referring now to FIGS. 11 and 11A-11C, a method of operating laser cleaving apparatus 150" is shown. To operate laser cleaving apparatus 150", an optical fiber 50 is placed and secured onto fiber tensioning apparatus 156. Then, laser 152 is activated to emit laser beam 151. In one embodiment, laser 152 emits laser beam 151 at a wavelength of 1030 nm, a pulse width of 400 ps, a repetition rate of 50 kHz, and an output power of 5 W. Laser beam 151 is emitted from laser 152 and travels throughout lens apparatus 154 as shown in FIG. 11 (i.e., passing through axicon lens 154A and aspheric lens 154B to alter the laser beam intensity profile of laser beam 151 and direct laser beam 151 to fiber tensioning apparatus 156). Upon entering fiber tensioning apparatus 156, laser beam 151 reflects off elliptical mirror 158 and is directed to axicon mirror 160 where laser beam 151 is reflected onto optical fiber 150 to create a crack, flaw, or perforation(s) on optical fiber ribbon 124 about the circumference of optical fiber 150 as shown in FIG. 11A. Then, as shown in FIG. 11B, tension is applied onto optical fiber 50 via rubber gripper 157 to hold optical fiber 50 in place. The tension applied onto optical fiber 50 by rubber gripper 157 is below a crack or flaw propagating threshold such that the flaw does not propagate on optical fiber 50. Once tension is applied, optical fiber 50 is then cleaved along the flaw by the tension applied onto optical fiber 50 by fiber tensioning apparatus 156.

In particular, either a second laser pulse from laser 152 is emitted and applied onto optical fiber or a piezo pulse is applied onto optical fiber 50 (via piezo transducers attached to rubber gripper 157) to propagate the crack or flaw and cleave optical fiber 50. The second laser pulse lowers the crack propagation threshold of optical fiber 50 below the tension applied onto optical fiber 50 by rubber gripper 157 to propagate the flaw and cleave optical fiber 50. In some embodiments, the second laser pulse has substantially the same characteristics of laser beam 151 discussed above. By contrast, the piezo pulse is applied at a voltage (and at various voltage time profiles shown) to increase tension applied onto optical fiber 50 to raise the tension above the crack propagation threshold and thereby, propagate the flaw and cleave optical fiber 50. In some embodiments, the piezo pulse is an acoustic wave that raises tension at the flaw to raise the tension above the crack propagation threshold. As used herein, "crack propagation threshold" refers to a tension applied onto optical fiber over which a flaw propagates radially about optical fiber 50.

Advantageously, the method outlined above increases consistency of the cleave of optical fiber 50 by reducing the area being cleaved. That is, the diameter of optical fiber 50 to be cleaved (via the initial laser flaw) is reduced from the nominal diameter to a diameter that is slightly above the diameter of core 51 (e.g., within about 20 μm).

Laser Polishing Apparatus 200

Figure 13:
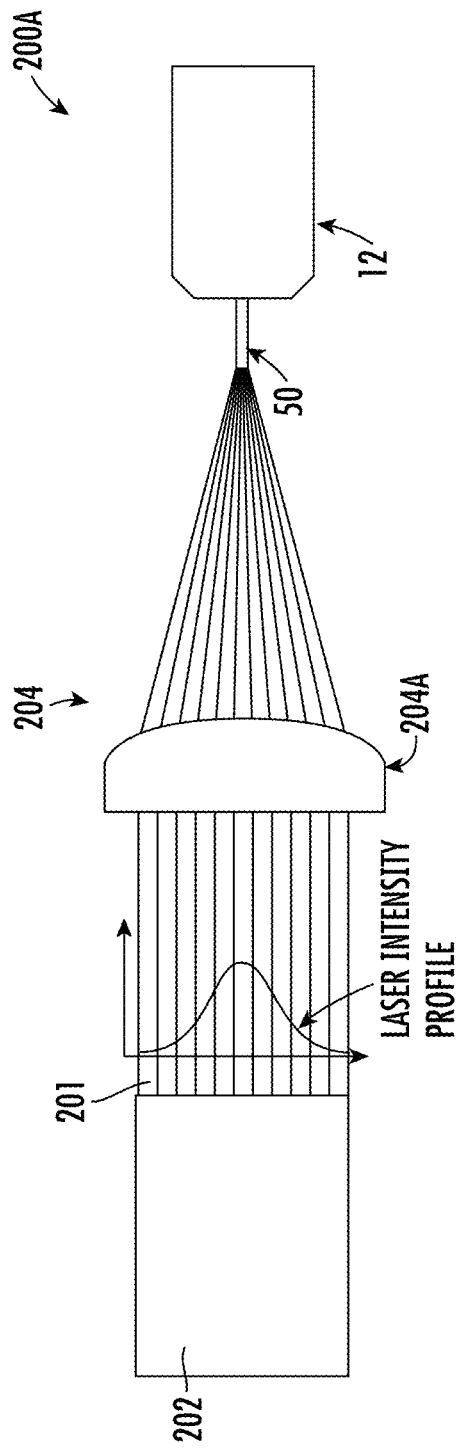
FIG. 13 is a schematic of a laser polishing apparatus for polishing the optical fiber of FIG. 5.

Referring now to FIGS. 13 and 14, laser polishing apparatuses 200A and 200B are shown. In general, laser polishing apparatuses 200A, 200B are configured to direct laser beams onto optical fiber 50 extending from a ferrule 12 as shown. It is contemplated and within the scope of the present disclosure that laser polishing apparatuses 200A, 200B can be used on optical fiber 50 prior to insertion into ferrule 12.

Referring first to FIG. 13, laser polishing apparatus 200A includes a laser 202 and lens apparatus 204. Laser 202 is configured to emit laser beam(s) 201 to polish optical fiber(s) 50. In some embodiments, laser 202 is a collimated or an ultrafast laser. However, it is within the scope of the present disclosure that alternate suitable lasers may be used. In some embodiments, laser 202 emits laser beam 201 at various wavelengths ranging between 200 nanometers (nm) and 10,600 nm, 375 nm and 1,100 nm, or 515 nm and 1080 nm. In one embodiment, laser beam 201 has a wavelength of about 976 nm. In some embodiments, laser 202 emits laser beam 201 at a pulse width between 0.19 picoseconds (ps) and 200,000 ps, 0.29 ps and 10,000 ps, or 10 ps and 1,000 ps. In one embodiment, the pulse width of laser beam 201 emitted from laser 202 is 400 ps. In some embodiments, laser 202 emits laser beam 201 at a repetition rate ranging between 0.01 kilohertz (kHz) and 80,000 kHz, 0.1 kHz and 10,000 kHz, or 1 kHz and 1,000 kHz. In one embodiment, laser 202 emits laser beam 201 at a repetition rate of 50 kHz. In some embodiments, laser 202 emits laser beam 201 at an output power ranging between 0.2 Watts (W) and 50 W, 1 W and 20 W, or 2 W and 10 W with a corresponding actual laser energy used for perforating an optical fiber ranging between 1 μJ per pulse and 1,000 μJ per pulse. In one embodiment, laser 202 emits laser beam 201 at an output power of about 5 W with a corresponding actual laser energy used for perforating an optical fiber of about 50 μJ per pulse.

As shown in FIG. 13, laser beam 201 passes through lens apparatus 204 after laser beam 201 is emitted from laser 202. Lens apparatus 204 includes an aspheric lens 204A and an axicon lens 204B. Aspheric lens 204A is configured to converge laser beam 201 onto optical fiber 50, and aspheric lens maintains laser intensity profile of laser beam 201 as shown. That is, the intensity of laser beam 201 is near the center of laser beam 201 with lesser intensity extending outwardly from the center. Laser beam 201 upon passing through aspheric lens 204A is focused onto optical fiber 50 with a greater laser intensity at the center of laser beam 201.

Referring now to FIG. 14, laser polishing apparatus 200B is shown. Laser polishing apparatus 200B has similar components as laser polishing apparatus 200A and such similar components are given the same reference number. The differences between laser polishing apparatus 200B and laser polishing apparatus 200A are noted below. Lens apparatus 204' includes an aspheric lens 204A and an axicon lenses 204B, 204C. As mentioned previously, aspheric lens 204A is configured to converge laser beam 201 onto optical fiber 50. Axicon lenses 204B, 204C are configured to invert a laser beam intensity profile and diverge laser beam 201. In addition, axicon lenses 204B, 204C can be translated along direction B1 to vary the laser beam intensity profile. As shown, by inverting the laser beam intensity profile, there is less power at the center of laser beam 201 with greater power extending outwardly from the center of laser beam 201. In this way, laser beam 201 as applied onto cladding 52 of optical fiber 50 can have a greater intensity applied onto portions of cladding 52 that are radially distanced from core-cladding interface 50A (FIG. 5) with a lesser intensity laser beam 201 applied onto portion of cladding 52 that are closer to core-cladding interface 50A (FIG. 5).

To operate laser polishing apparatuses 200A, 200B, laser 202 is activated to emit laser beam 201. In one embodiment, laser 202 emits laser beam 201 at a wavelength of 976 nm, a pulse width of 400 ps, a repetition rate of 50 kHz, and an output power of 5 W. Laser beam 201 is emitted from laser 202 and travels through lens apparatus 200A or 200B as shown in FIGS. 13 and 14 (i.e., passing through axicon lens 204A and/or aspheric lens 204B to alter the laser beam intensity profile of laser beam 201 and direct laser beam 201 onto optical fiber 50 to polish optical fiber 50).

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. An optical fiber comprising:
   a fiber core comprising glass, the fiber core having a longitudinal axis and a core end face;
   a cladding surrounding the fiber core to form a core-cladding interface;
      wherein the cladding comprises glass that is doped with a dopant, wherein the cladding comprises a dopant concentration gradient in a radial direction such that a concentration of the dopant continuously changes within the cladding with respect to a radial distance from the core-cladding interface, and wherein the cladding is configured to absorb a laser beam having a wavelength between 200 nanometers (nm) and 10,600 nm;
      wherein the dopant concentration gradient varies such that a first dopant concentration at a first location distal to the core-cladding interface is greater than a second dopant concentration at a second location proximal to the core-cladding interface;
      wherein the dopant comprises non-rare earth metals; and
      wherein the optical fiber with the dopant is cleaved upon absorbing the laser beam.

2. The optical fiber of claim 1, wherein the dopant is selected from the group consisting of: non-rare earth metals including chromium, vanadium, titanium, and manganese.

3. The optical fiber of claim 1, wherein the glass fiber core is proud of the cladding after the cladding absorbs the laser beam.

4. The optical fiber of claim 1, wherein a fiber end face is defined by the core end face and a cladding end face, wherein the fiber end face is convex.

5. The optical fiber of claim 1, wherein an end face of the optical fiber is formed by a linear perforation along at least a portion of the end face.

6. The optical fiber of claim 5, wherein the linear perforation is oriented around a circumference of the optical fiber.

7. A method of laser cleaving and polishing an optical fiber, wherein the optical fiber includes a fiber core that comprises glass and a cladding that surrounds the fiber core to form a core-cladding interface, wherein the cladding comprises glass and is doped with a dopant, wherein the cladding comprises a dopant concentration gradient in a radial direction such that a concentration of the dopant continuously changes within the cladding with respect to radial distance from the core-cladding interface, wherein the dopant concentration gradient varies such that a first dopant concentration at a first location distal to the core-cladding interface is greater than a second dopant concentration at a second location proximal to the core-cladding interface the method comprising:
   emitting a laser beam having a wavelength between 200 nm and 10,600 nm;
   directing the laser beam to create a perforation along at least a portion of the optical fiber; and
   propagating the perforation to cleave the optical fiber to create an end face of the optical fiber;
   wherein the dopant comprises non-rare earth metals.

8. The method of claim 7, wherein propagating the perforation comprises applying tension to the optical fiber, wherein the tension is applied to the optical fiber while directing the laser beam.

9. The method of claim 7, wherein propagating the perforation comprises applying a vacuum onto the optical fiber to cleave the optical fiber.

10. The method of claim 7, wherein directing the laser beam includes a fiber tensioning apparatus comprising an axicon mirror that is angled between 15 degrees and 75 degrees relative to a longitudinal axis of the optical fiber.

11. The method of claim 10, wherein the end face of the optical fiber is substantially orthogonal to a longitudinal axis of the optical fiber.

12. The method of claim 7, wherein directing the laser beam includes a fiber tensioning apparatus comprising an axicon mirror that is angled between 15 degrees and 75 degrees relative to a longitudinal axis of the optical fiber such that the laser contacts the optical fiber at an angle between 15 degrees and 90 degrees.

13. The method of claim 12, wherein the end face of the optical fiber is angled relative to the longitudinal axis of the optical fiber at an angle between 15 degrees and 90 degrees.

14. The method of claim 13, wherein the end face of the optical fiber is convex relative to the longitudinal axis of the optical fiber.

15. An optical fiber connector assembly comprising:
   an optical fiber comprising:
      a fiber core comprising glass, the fiber core having a longitudinal axis;
      a cladding surrounding the fiber core to form a core-cladding interface;
         wherein the cladding comprises glass that is doped with a dopant, wherein the cladding comprises a dopant concentration gradient in a radial direction such that a concentration of the dopant continuously changes within the cladding with respect to radial distance from the core-cladding interface, wherein the dopant concentration gradient varies such that a first dopant concentration at a first location distal to the core-cladding interface is greater than a second dopant concentration at a second location proximal to the core-cladding interface and wherein the dopant is configured to absorb a laser beam having a wavelength between 200 nm and 10,600 nm that contacts the optical fiber at an angle between 15 degrees and 90 degrees of the longitudinal axis;
   a ferrule having a front end, a rear end, and a ferrule bore extending from the rear end to the front end;
      wherein the optical fiber extends through the ferrule bore of the ferrule such that the optical fiber protrudes beyond the front end of the ferrule and the optical fiber has an end face that is convex relative to the longitudinal axis; and wherein the dopant comprises non-rare earth metals; and wherein the optical fiber with the dopant is cleaved upon absorbing the laser beam.

16. The optical fiber connector assembly of claim 15, wherein the ferrule has a coefficient of thermal expansion of about 10–5/° C.

17. The optical fiber connector assembly of claim 15, wherein the ferrule comprises zirconia or ytterbium stabilized zirconia.

18. The optical fiber connector assembly of claim 15, wherein an adhesive is housed within the ferrule bore.

19. The optical fiber connector assembly of claim 15, wherein the dopant is selected from the group consisting of: non-rare earth metals including chromium, vanadium, titanium, and manganese.

20. The optical fiber connector assembly of claim 15, wherein the concentration of the dopant decreases as a function of radial distance from the core-cladding interface.

21. The optical fiber connector assembly of claim 15, wherein the fiber core is proud of the cladding after the cladding absorbs the laser beam.

22. The optical fiber connector assembly of claim 15, wherein the end face of the optical fiber is formed by a linear perforation along at least a portion of the end face.

23. The optical fiber connector assembly of claim 15, wherein the end face of the optical fiber is formed by a linear perforation that is oriented around a circumference of the optical fiber.

24. A method of laser cleaving and polishing an optical fiber, wherein the optical fiber includes a fiber core that comprises glass and a cladding that surrounds the fiber core to form a core-cladding interface, wherein the cladding comprises glass and is doped with a dopant, wherein the cladding comprises a dopant concentration gradient in a radial direction such that a concentration of the dopant continuously changes within the cladding with respect to radial distance from the core-cladding interface, wherein the dopant concentration gradient varies such that a first dopant concentration at a first location distal to the core-cladding interface is greater than a second dopant concentration at a second location proximal to the core-cladding interface the method comprising:

emitting a first laser beam having a wavelength between 200 nm and 10,600 nm;

directing the laser beam to create a perforation along at least a portion of the optical fiber; and propagating a linear perforation to cleave the optical fiber to create an end face of the optical fiber;

wherein the dopant comprises non-rare earth metals.

25. The method of claim 24, wherein propagating the linear perforation comprises:

emitting a second laser beam having a wavelength between 200 nm and 10,600 nm.

26. The method of claim 24, wherein propagating the linear perforation comprises:

applying a piezo pulse onto the optical fiber to propagate the linear performation and cleave the optical fiber.

* * * * *